US012689547B2

(12) United States Patent
Mochizuki

(10) Patent No.: US 12,689,547 B2
(45) Date of Patent: Jul. 21, 2026

(54) WIRELESS COMMUNICATION APPARATUS AND WIRELESS COMMUNICATION METHOD

(71) Applicant: NEC Corporation, Tokyo (JP)

(72) Inventor: Takuji Mochizuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 318 days.

(21) Appl. No.: 18/387,148

(22) Filed: Nov. 6, 2023

(65) Prior Publication Data

US 2024/0171444 A1     May 23, 2024

(30) Foreign Application Priority Data

Nov. 17, 2022    (JP) .................................. 2022-183944

(51) Int. Cl.
*H04L 27/26*          (2006.01)
(52) U.S. Cl.
CPC .... *H04L 27/26362* (2021.01); *H04L 27/2657* (2013.01)
(58) Field of Classification Search
CPC ........... H04L 27/26362; H04L 27/2657; H04L 27/2623; H04L 5/001; H04B 1/0475
USPC .................................................. 375/295–297
See application file for complete search history.

(56) References Cited

U.S. PATENT DOCUMENTS 9,008,156 B1 *    4/2015  Dick ................... H04W 84/047
                                                                375/220
2004/0264595 A1 *  12/2004 Kim .................... H04L 27/2621
                                                                375/296
2006/0176969 A1 *   8/2006  Trivedi ............... H04L 27/2624
                                                                375/260
2008/0247487 A1 *  10/2008  Cai ..................... H04L 27/2623
                                                                375/296
2010/0303182 A1 *  12/2010  Daneshrad ........... H04B 1/7102
                                                                455/63.1
2014/0328431 A1 *  11/2014  Haddad ............. H04L 25/03859
                                                                375/296
2015/0004923 A1 *   1/2015  Beaudin .............. H04L 27/2614
                                                                455/127.2
2017/0104501 A1 *   4/2017  Carlsson ............. H04L 27/2623
2018/0115331 A1 *   4/2018  Lange ................. H04L 27/2623
2018/0139750 A1 *   5/2018  Takahashi ............ H04W 72/21
2020/0204418 A1 *   6/2020  Fomin ............... H04L 25/03834
2021/0176107 A1 *   6/2021  Hou ....................... H03F 1/3241
2023/0111822 A1 *   4/2023  Wolff .................. H04L 27/2623
                                                                455/552.1
2023/0324502 A1 *  10/2023  Li ........................... G01S 11/02
                                                                455/456.1

FOREIGN PATENT DOCUMENTS

JP          2020-523833 A      8/2020

* cited by examiner

*Primary Examiner* — Emmanuel Bayard

(57)          ABSTRACT

A wireless communication apparatus according to the present disclosure includes: a crest factor reduction (CFR) circuit; a digital pre-distortion (DPD) circuit; at least one memory configured to store instructions; and at least one processor configured to execute the instructions to determine frequency arrangement of a synthesized time signal of a plurality of component carriers (CCs) acquired by synthesizing time signals of each of the plurality of CCs being input to the CFR circuit, and control the CFR circuit, based on the determined frequency arrangement of the synthesized time signal of the plurality of CCs.

7 Claims, 28 Drawing Sheets

Peak Distance distribution
(preCFR waveform)

Analog Conversion of full iBW and DPD Synthesis BW

DPD Synth BW

50 MHz

40 MHz

80 MHz

400MHz

Fig. 2

2CC Contiguous

2CC Contiguous

2CC Non-Contiguous

2CC Non-Contiguous

Before CFR

Peak threshold

CFR Iteration

After CFR

START

DETERMINE FREQUENCY ARRANGEMENT OF SYNTHESIZED
TIME SIGNAL OF PLURALITY OF CCs — S11

CONTROL CFR CIRCUIT, BASED ON FREQUENCY ARRANGEMENT
OF SYNTHESIZED TIME SIGNAL OF PLURALITY OF CCs — S12

END

WIRELESS COMMUNICATION APPARATUS AND WIRELESS COMMUNICATION METHOD

INCORPORATION BY REFERENCE

This application is based upon and claims the benefit of priority from Japanese patent application No. 2022-183944, filed on Nov. 17, 2022, the disclosure of which is incorporated herein in its entirety by reference.

TECHNICAL FIELD

The present disclosure relates to a wireless communication apparatus and a wireless communication method.

BACKGROUND ART

A transmission amplifier (AMP) is mounted on a radio unit (RU) being an active antenna system (AAS) or the like. However, there is a concern that communication quality such as adjacent channel leakage ratio/error vector magnitude (ACLR/EVM) deteriorates due to nonlinear distortion properties such as amplitude modulation (AM)-AM/AM-phase modulation (PM) of the transmission AMP.

Therefore, in the RU, a digital pre-distortion (DPD) circuit is configured to linearize the nonlinear distortion properties of the transmission AMP and thereby improve ACLR/EVM. However, in the RU, a crest factor reduction (CFR) circuit is a key fundamental technological element in order to further improve ACLR/EVM by the DPD circuit. The CFR circuit is disclosed in, for example, Published Japanese Translation of PCT International Publication for Patent Application No. 2020-523833.

Hereinafter, an RU according to a related art is described. Note that the following description and drawings are omitted or simplified as appropriate for clarity of description. In the following drawings, the same element is denoted by the same reference numeral, and redundant description is omitted as necessary. Further, specific numerical values and the like described below are merely examples for facilitating understanding of the present disclosure, and are not limited thereto.

FIG. 1 is a diagram illustrating a configuration example of an RU 10 according to the related art. In FIG. 1, a unidirectional arrow briefly indicates a direction of flow of a certain signal (data), and does not exclude bidirectionality (the same applies to FIGS. 3 and 23 described later).

As illustrated in FIG. 1, the RU 10 according to the related art includes an optical transceiver 11, an enhanced common public radio interface (eCPRI) unit 12, a low-physical layer (LPHY) unit 13, a plurality of carrier digital up converters (CDUCs) 14, a plurality of adders 15, a digital baseband unit 16, a TRX-frontend unit 17, and a plurality of antennas 18.

The LPHY unit 13 receives a data stream to be transmitted from a distributed unit (DU) 20 to each terminal of a plurality of radio access network (RAN) sharing operators via the optical transceiver 11 and the eCPRI unit 12. Herein, the data stream is composed of a plurality of component carriers (CCs). Specifically, a plurality of CC signals including a plurality of CCs are input to the LPHY unit 13 for each frequency.

The LPHY unit 13 includes an inverse fast Fourier transform (IFFT) unit (not illustrated). The IFFT unit converts a plurality of CC signals being input for each frequency into a time signal for each CC, and outputs the time signal for each CC to each of the plurality of CDUCs 14.

The plurality of CDUCs 14 are provided in association with each of a plurality of transceivers (TRXs) 171, which is described later, in the TRX-frontend unit 17.

It is assumed that the RU 10 illustrated in FIG. 1 is able to support up to eight CCs. Therefore, each CDUC 14 includes eight DUC slices provided in association with the eight CCs.

Each of the DUC slices includes a channel filter 141, a numerically controlled oscillator (NCO) 142, and a multiplier 143. The DUC slice uses the channel filter 141 and extracts the time signal of the associated CC from among the time signal of each CC of the associated TRX 171. Then, the DUC slice uses the NCO 142 and the multiplier 143 and arranges the time signal of the associated CC on a digital baseband (DBB) frequency axis.

The plurality of adders 15 are provided in association with the plurality of TRXs 171, which are described later.

Each of the adders 15 synthesizes the time signal of each of the CCs of the associated TRX 171 being arranged on the DBB frequency axis, and outputs the synthesized time signal to the digital baseband unit 16 as a synthesized time signal of a plurality of CCs of the associated TRX 171.

Figure 2:
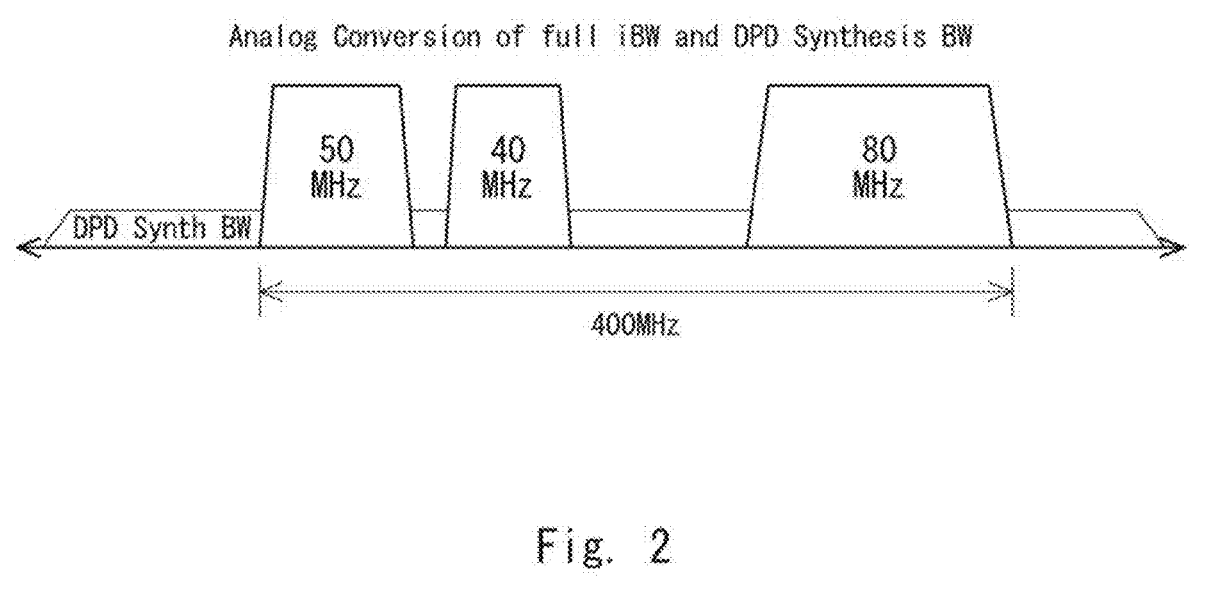

FIG. 2 is a diagram illustrating an example of frequency arrangement of a synthesized time signal of a plurality of CCs. In the synthesized time signal of a plurality of CCs illustrated in FIG. 2, three CCs are non-contiguously arranged. Hereinafter, such a state is appropriately referred to as a 3CC non-contiguous state. The frequency arrangement of the 3CC non-contiguous state is similar to a DBB spectrum employed in the United Kingdom. Hereinafter, a state in which two CCs are contiguously arranged is appropriately referred to as a 2CC contiguous state. The frequency arrangement of the 2CC contiguous state is almost equivalent to the frequency arrangement employed in Germany. Further, hereinafter, a state in which two CCs are non-contiguously arranged is appropriately referred to as a 2CC non-contiguous state.

The digital baseband unit 16 includes a plurality of CFR circuits 161 and a plurality of DPD circuits 162.

The plurality of CFR circuits 161 and the plurality of DPD circuits 162 are each provided in association with the plurality of TRXs 171 to be described later.

Each of the CFR circuits 161 performs soft clipping processing of suppressing a peak of the synthesized time signal of the plurality of CCs of the associated TRX 171. Specifically, the CFR circuit 161 suppresses the peak of the synthesized time signal of the plurality of CCs in such a way as to be equal to or lower than a saturation (Psat) level of a transmission AMP 172 to be described later, which is provided in a subsequent stage of the associated TRX 171.

The synthesized time signal of the plurality of CCs to which a nonlinear distortion is applied by the transmission AMP 172 (to be described later) provided in a subsequent stage of the associated TRX 171 is fed back to each of the DPD circuits 162. Then, each DPD circuit 162 successively forms AM/PM having an inverse property to the nonlinearity of the transmission AMP 172 as a DPD weight in such a way that the fed back synthesized time signal of the plurality of CCs asymptotically approximates the synthesized time signal of the plurality of CCs after output from the CFR circuit 161 (before input to the DPD circuit 162). Then, each DPD circuit 162 multiplies the formed DPD weight by the synthesized time signal of the plurality of CCs after output from the CFR circuit 161. When the synthesized time signal of the plurality of CCs acquired by this multiplication passes through the transmission AMP 172, nonlinear distortions such as AM/PM distortions of the transmission AMP 172 are cancelled out, and nonlinear distortions in a vicinity of the maximal rated transmission power (root mean square (RMS)) level are linearized.

The TRX-frontend unit 17 includes a plurality of the TRXs 171, a plurality of the transmission AMPs 172, a plurality of reception AMPs 173, a plurality of couplers 174, a plurality of switches 175, and a plurality of band pass filters (BPFs) 176.

The plurality of transmission AMPs 172, the plurality of reception AMPs 173, the plurality of couplers 174, the plurality of switches 175, and the plurality of BPFs 176 are each provided in association with each of the plurality of TRXs 171.

The synthesized time signal of the plurality of CCs is subjected to RMS level matching in the TRX 171, amplified in the transmission AMP 172, passed through a predetermined frequency band in the BPF 176, and then output to an associated antenna 18 and transmitted to user equipment (UE: terminal).

In addition, the synthesized time signal of the plurality of CCs to which the nonlinear distortion is applied in the transmission AMP 172 is fed back by the coupler 174 to the associated DPD circuit 162.

Meanwhile, a signal received from the UE by the associated antenna 18 is amplified by the reception AMP 173 and output to the TRX 171.

The switch 175 is a switch for switching between transmission and reception.

Note that, in FIG. 1, only a configuration related to transmission is illustrated as a configuration between the LPHY unit 13 and the digital baseband unit 16, and a configuration related to reception is omitted.

FIG. 3 is a diagram illustrating an example of a waveform of the synthesized time signal of the plurality of CCs after an input stage of the CFR circuit 161, in the RU 10 illustrated in FIG. 1.

In FIG. 3, a waveform W1 indicates a waveform of the synthesized time signal of the plurality of CCs before input from the CFR circuit 161.

The CFR circuit 161 performs soft clipping processing of suppressing a peak of the waveform W1 in such a way as to be equal to or lower than a saturation (Psat) level of the transmission AMP 172. As a result, a waveform W2 is acquired.

The TRX 171 performs level matching of the RMS level of the waveform W2 with another TRX 171. As a result, a waveform W3 is acquired.

The transmission AMP 172 amplifies the waveform W3. At this time, the nonlinear distortion of the transmission AMP 172 is applied to the waveform W3. As a result, a waveform W4 is acquired. The linearity of a region to which the nonlinear distortion of the waveform W4 is applied is improved by the DPD circuit 162.

Thus, it is necessary to ensure the following relationship:

Maximum rated transmission power (RMS) level+CFR threshold<Psat (saturation output) of transmission AMP 172

For this purpose, it is important that the CFR circuit 161 always maintains magnitude relationship between the level of the peak of the input signal of the transmission AMP 172 and the level of the Psat (saturation output) of the transmission AMP 172.

Therefore, a main objective of the CFR circuit 161 is the following two items.
Objective (1):

Hard clipping at the Psat of the transmission AMP 172 may cause occurrence of significant higher-order nonlinear distortion. The objective (1) is to avoid improvement of distortion compensation by the DPD circuit 162 from becoming impossible in such a case.
Objective (2):

In a case where an efficiency-oriented Doherty AMP is adopted as the transmission AMP 172, current consumption increases when an inadvertent peak is applied. The objective (2) is to avoid exceeding allowable power consumption and heat dissipation amount of the RU 10 due to the increase in the current consumption in such a case.

However, a location of the RU 10 may be changed. For example, when the location of the RU 10 is changed from Germany to the United Kingdom, frequency arrangement of the synthesized time signal of the plurality of CCs is switched or changed from the 2CC contiguous state to the 3CC non-contiguous state.

When the frequency arrangement of the synthesized time signal of the plurality of CCs is switched or changed from the 2CC contiguous state to the 2CC non-contiguous state or the 3CC non-contiguous state, a frequency of occurrence of a peak time of the synthesized time signal of the plurality of CCs and a half width of the peak time change.

Therefore, a first technical problem to be solved by the present disclosure is to autonomously set the CFR circuit 161 to an optimum setting according to a change in the frequency arrangement of the synthesized time signal of the plurality of CCs. Hereinafter, the first technical problem of the present disclosure is described in detail.

FIG. 4 is a diagram illustrating an example of frequency arrangement of a synthesized time signal of a plurality of CCs in a 2CC contiguous state. FIG. 5 is a diagram illustrating an example of a frequency spectrum of the synthesized time signal of the plurality of CCs in the 2CC contiguous state illustrated in FIG. 4. FIG. 6 is a diagram illustrating an example of a peak phase of the synthesized time signal of the plurality of CCs in the 2CC contiguous state illustrated in FIG. 4.

Meanwhile, FIG. 7 is a diagram illustrating an example of frequency arrangement of a synthesized time signal of a plurality of CCs in a 3CC non-contiguous state. FIG. 8 is a diagram illustrating an example of a frequency spectrum of the synthesized time signal of the plurality of CCs in a 2CC non-contiguous state similar to the 3CC non-contiguous state illustrated in FIG. 7. FIG. 9 is a diagram illustrating an example of a peak phase of the synthesized time signal of the plurality of CCs in the 2CC non-contiguous state similar to the 3CC non-contiguous state illustrated in FIG. 7.

As illustrated in FIGS. 6 and 9, in a case of frequency arrangement in the 2CC non-contiguous state, a frequency of occurrence of a peak time is increased and a half width of the peak time is decreased, as compared with a case of the frequency arrangement in the 2CC contiguous state. Therefore, it can be said that, as the frequency interval between CCs increases, the occurrence frequency of the peak time increases and the half width of the peak time decreases.

This phenomenon corresponds to an increase in a beat frequency of an AM modulation component of the synthesized time signal of the plurality of CCs as the frequency interval between CCs increases, that is, an increase in the occurrence frequency of the peak time and a decrease in the half width of the peak time. In other words, this phenomenon is a phenomenon in which, when the beat frequency of the AM modulation component of the synthesized time signal of the plurality of CCs increases, a peak having a decreased half width of a peak time appears at a high frequency regarding time.

FIG. 10 is a diagram illustrating an example of distribution of peaks of the synthesized time signal of the plurality of CCs in each of the 2CC contiguous state and the 3CC non-contiguous state. FIG. 11 is a diagram illustrating an example of distribution of peak distances of the synthesized time signal of the plurality of CCs in each of the 2CC contiguous state and a 3CC non-contiguous state. The Peak distance indicates a distance between an occurrence position of the peak and an occurrence position of a previous peak.

As illustrated in FIGS. 10 and 11, the frequency arrangement in the 3CC non-contiguous state is higher in the occurrence frequency of peaks and extension of peak than in the frequency arrangement in the 2CC contiguous state.

FIG. 12 is a diagram illustrating an example of a peak phase before and after the CFR processing by the CFR circuit 161 is performed once on a synthesized time signal of a plurality of CCs having certain frequency arrangement.

As illustrated in FIG. 12, there may be a peak that is not suppressed by performing the CFR processing only once. Such a peak is suppressed by the CFR processing to be performed next.

Therefore, the CFR circuit 161 performs CFR iteration of cyclically performing the CFR processing. In the CFR iteration, a time waveform group after the CFR processing is performed is stored in a first-in first-out (FIFO), and then the CFR processing is performed again. In this manner, the CFR circuit 161 performs the CFR processing in a cyclic manner.

FIG. 13 is a diagram illustrating an example of a peak level distribution after the CFR processing is performed twice on the synthesized time signal of the plurality of CCs in each of the 2CC contiguous state and the 3CC non-contiguous state.

As illustrated in FIG. 13, in the synthesized time signal of the plurality of CCs in the 2CC contiguous state, two times of the CFR processing completely suppress the peaks. However, in the synthesized time signal of the plurality of CCs in the 3CC non-contiguous state, peaks may remain even when the CFR processing is performed twice. In such a case, since a frequency of occurrence of the peak time is higher in the synthesized time signal of the plurality of CCs in the 3CC non-contiguous state than in the synthesized time signal of the plurality of CCs in the 2CC contiguous state, it is considered that peaks tend to remain even when the number of times of the CFR iteration is increased.

As described above, when a plurality of CCs are arranged in a non-contiguous manner as in the frequency arrangement in the 3CC non-contiguous state, in other words, when the frequency interval among CCs is wide, the frequency of occurrence of the peak time is increased and the half width of the peak time is reduced.

Therefore, when a plurality of CCs are arranged in a non-contiguous manner, a degree of suppression of peak components increases as the number of times of the CFR iteration is increased and a CFR threshold is set to be lowered. However, on the other hand, since the synthesized time signal of the plurality of CCs itself is excessively lost, communication quality of the EVM or the like is deteriorated. This point relates to a second technical problem to be described later of the present disclosure.

Herein, a configuration example of the CFR circuit 161 is described.

FIG. 14 is a diagram illustrating a configuration example of the CFR circuit 161.

As illustrated in FIG. 14, the CFR circuit 161 includes a switch 1611, a converter 1612, a peak detector 1613, a basic impulse signal generator 1614, an inverse impulse generator 1615, a delay FIFO 1616, an adder 1617, and an iteration determiner 1618.

The CFR circuit 161 receives a synthesized time signal of a plurality of CCs as complex signals from an associated adder 15.

The switch 1611 outputs either the synthesized time signal of the plurality of CCs being input from the adder 15 or a synthesized time signal of a plurality of CCs being input from the iteration determiner 1618 after several CFR processing are performed.

The converter 1612 converts a complex signal I+jQ being output as a synthesized time signal of a plurality of CCs from the switch 1611, into a power level $I^2+Q^2$, and outputs the converted result.

The peak detector 1613 detects a peak being equal to or larger than the CFR threshold of the synthesized time signal of the plurality of CCs, based on the output of the converter 1612, and extracts and outputs a level c exceeding a time position 1 and the CFR threshold for each of the detected peaks.

The basic impulse signal generator 1614 generates a basic impulse signal.

The inverse impulse generator 1615 generates and outputs an inverse impulse for suppressing peaks of the synthesized time signal of the plurality of CCs, based on the basic impulse signal generated by the basic impulse signal generator 1614. A detailed operation of the inverse impulse generator 1615 is described later.

The delay FIFO 1616 delays the synthesized time signal of the plurality of CCs being output from the switch 1611, and performs timing matching when the inverse impulse is added by the adder 1617 in the subsequent stage.

The adder 1617 performs CFR processing of adding the inverse impulse being output from the inverse impulse generator 1615 at a peak position of the synthesized time signal of the plurality of CCs being output from the delay FIFO 1616. Thus, peak suppression of the synthesized time signal of the plurality of CCs is achieved.

The iteration determiner 1618 determines whether to perform the CFR processing again. For example, the iteration determiner 1618 determines that the CFR processing is to be performed again when the number of times of performing the CFR processing has not reached the number of times of the CFR iteration being set in the CFR circuit 161. When performing the CFR processing again, the iteration determiner 1618 inputs the synthesized time signal of the plurality of CCs being output from the adder 1617, to the switch 1611. Meanwhile, when the CFR processing is not to be performed again, the iteration determiner 1618 outputs the synthesized time signal of the plurality of CCs being output from the adder 1617, to the associated DPD circuit 162 in the subsequent stage.

Herein, a detailed operation of the inverse impulse generator 1615 is described.

First, the inverse impulse generator 1615 calculates a correction amplitude (error magnitude vector) c being a peak suppression amount. The correction amplitude c corresponds to the peak level c extracted by the peak detector 1613.

Next, the inverse impulse generator 1615 generates an inverse impulse base signal, based on the basic impulse signal generated by the basic impulse signal generator 1614 and the correction amplitude E. An example of the inverse impulse base signal is illustrated in FIG. 15.

Next, the inverse impulse generator 1615 generates an inverse impulse by passing the inverse impulse base signal through a CFR filter (correction pulse filter) having a passband according to the frequency arrangement of the synthesized time signal of the plurality of CCs. By this processing, a frequency component of the inverse impulse may be adjusted to the frequency arrangement of the synthesized time signal of the plurality of CCs. Therefore, it is possible to prevent a wideband spread spectrum due to the inverse impulse from leaking out of a region where the CC is arranged. This processing corresponds to multiplication and mixing as time domain processing, and corresponds to convolution integration as frequency domain processing. An example of such processing is illustrated in FIG. 16. An example of an inverse impulse generated by such processing is illustrated in FIG. 17.

Thereafter, the inverse impulse generator 1615 adds the inverse impulse to the adder 1617 at the peak position of the synthesized time signal of the plurality of CCs. As a result, the peak of the synthesized time signal of the plurality of CCs is suppressed. FIG. 18 illustrates an example in which a peak of the synthesized time signal of the plurality of CCs is suppressed.

Next, a second technical problem to be solved by the present disclosure is described.

As described above, when a plurality of CCs are arranged in a non-contiguous state, a degree of suppression of peak components increases as the number of times of the CFR iteration increases. However, on the other hand, since the synthesized time signal of the plurality of CCs itself is excessively lost, communication quality such as EVM is deteriorated.

Therefore, when the CFR threshold is not increased while power backoff is being performed, a problem that communication quality such as EVM cannot be maintained and secured occurs. Herein, the power backoff indicates lowering the maximum rated transmission power (RMS) level and thereby ensuring a backoff between Psat of the transmission AMP 172 and RMS. However, when the CFR threshold is set excessively high, Psat becomes equal to or less than the CFR threshold, and saturation of a transmission system is predominantly determined by Psat. In such a case, hard clipping by Psat always occurs, leading to a large amount of high-order nonlinear distortion being generated. Therefore, nonlinear distortion compensation by the DPD circuit 162 becomes difficult. Therefore, careful attention needs to be paid to inadvertently increasing the CFR threshold.

FIG. 19 is a diagram illustrating an example of a peak-to-average power ratio/complementary cumulative distribution function (PAPR/CCDF) property when CFR is inactivated of the synthesized time signal of the plurality of CCs in each of a 2CC contiguous state and a 3CC non-contiguous state. FIG. 20 is a diagram illustrating an example of a PAPR/CCDF property when CFR is activated of the synthesized time signal of the plurality of CCs in each of the 2CC contiguous state and the 3CC non-contiguous state. FIG. 21 is an enlarged view of an x-region illustrated in FIG. 20. In FIGS. 20 and 21, the CFR threshold is 8.5 dB.

As illustrated in FIG. 19, when CFR is inactivated, that is, when peak suppression is not performed by the CFR processing, it can be seen that there is no difference in CCDF between the 2CC contiguous state and the 3CC non-contiguous state.

Meanwhile, as illustrated in FIGS. 20 and 21, when CFR is activated, that is, when peak suppression is performed by the CFR processing, PAPR in a vicinity of the CFR threshold becomes 0.2 dB smaller in the case of the 3CC non-contiguous state than in the case of the 2CC contiguous state. Therefore, in the case of the 3CC non-contiguous state, peaks are suppressed by the CFR processing as compared with the case of the 2CC contiguous state. In other words, in the case of the 3CC non-contiguous state, when peak suppression by the CFR processing is thoroughly performed, a signal purity is deteriorated by 0.2 dB as compared with the case of the 2CC contiguous state. Therefore, in the case of the 3CC non-contiguous state, deterioration of the EVM is noticeably caused by the CFR.

Therefore, in the case of the 3CC non-contiguous state, in order to achieve an EVM being equivalent to the EVM in the case of the 2CC contiguous state, the related art requires the CFR circuit 161 to increase power backoff and decrease a level of the maximum rated transmission power (RMS). However, the EVM (=downlink (DL) signal to interference plus noise ratio (SINR)) can be finally secured at the expense of lowering the transmission equivalent isotropically radiated power (EIRP). However, a decrease in transmission EIRP leads to a reduction in DL coverage.

FIG. 22 is a diagram illustrating an example of a PAPR/EVM property of the synthesized time signal of the plurality of CCs for each of a 2CC contiguous state and a 3CC non-contiguous state.

As illustrated in FIG. 22, in the case of the 3CC non-contiguous state, the (CFR threshold) vs. (EVM property) is deteriorated as compared with the case of the 2CC contiguous state. As an example, it can be seen that, in order to acquire EVM 2% (5G NR-TM3. 1a: 256 quadrature amplitude modulation (QAM) EVM Core Spec 3.5%, Test Tolerance: +1% added test specification is 4.5% or less) in the case of the 3CC non-contiguous state, power backoff of 0.6 dB is required.

Therefore, the technical problem of the present disclosure is summarized as follows.

First Technical Problem

The first technical problem is to autonomously set the CFR circuit 161 to an optimum setting according to a change in the frequency arrangement of the synthesized time signal of the plurality of CCs.

Second Technical Problem

In a case where a frequency interval between the CCs is widened by changing the frequency arrangement of the synthesized time signal of the plurality of CCs from the 2CC contiguous state to the 3CC non-contiguous state or the like, when peak suppression by the CFR processing is completed, the synthesized time signal of the plurality of CCs is lost, and communication quality such as EVM deteriorates. Therefore, the second technical problem is to avoid deterioration of communication quality such as EVM due to excessive peak suppression by CFR in a case where the frequency interval between CCs is widened.

SUMMARY

An example object of the present disclosure is to provide a wireless communication apparatus and a wireless communication method that are able to contribute to solution of any of the technical problems described above.

In a first example aspect, a wireless communication apparatus includes:

a crest factor reduction (CFR) circuit;
   a digital pre-distortion (DPD) circuit;
   at least one memory configured to store instructions; and
   at least one processor configured to execute the instructions to
      determine frequency arrangement of a synthesized time
         signal of a plurality of component carriers (CCs)

acquired by synthesizing time signals of each of the plurality of CCs being input to the CFR circuit, and control the CFR circuit, based on the determined frequency arrangement of the synthesized time signal of the plurality of CCs.

In a second example aspect, a wireless communication method to be executed by a wireless communication apparatus including a crest factor reduction (CFR) circuit and a digital pre-distortion (DPD) circuit includes:

determining frequency arrangement of a synthesized time signal of a plurality of component carriers (CCs) acquired by synthesizing time signals of each of the plurality of CCs being input to the CFR circuit; and controlling the CFR circuit, based on the determined frequency arrangement of the synthesized time signal of the plurality of CCs.

BRIEF DESCRIPTION OF DRAWINGS

The above and other aspects, features, and advantages of the present disclosure will become more apparent from the following description of certain example embodiments when taken in conjunction with the accompanying drawings, in which:

FIG. 2 is a diagram illustrating an example of frequency arrangement of a synthesized time signal of a plurality of CCs;

Figure 18:
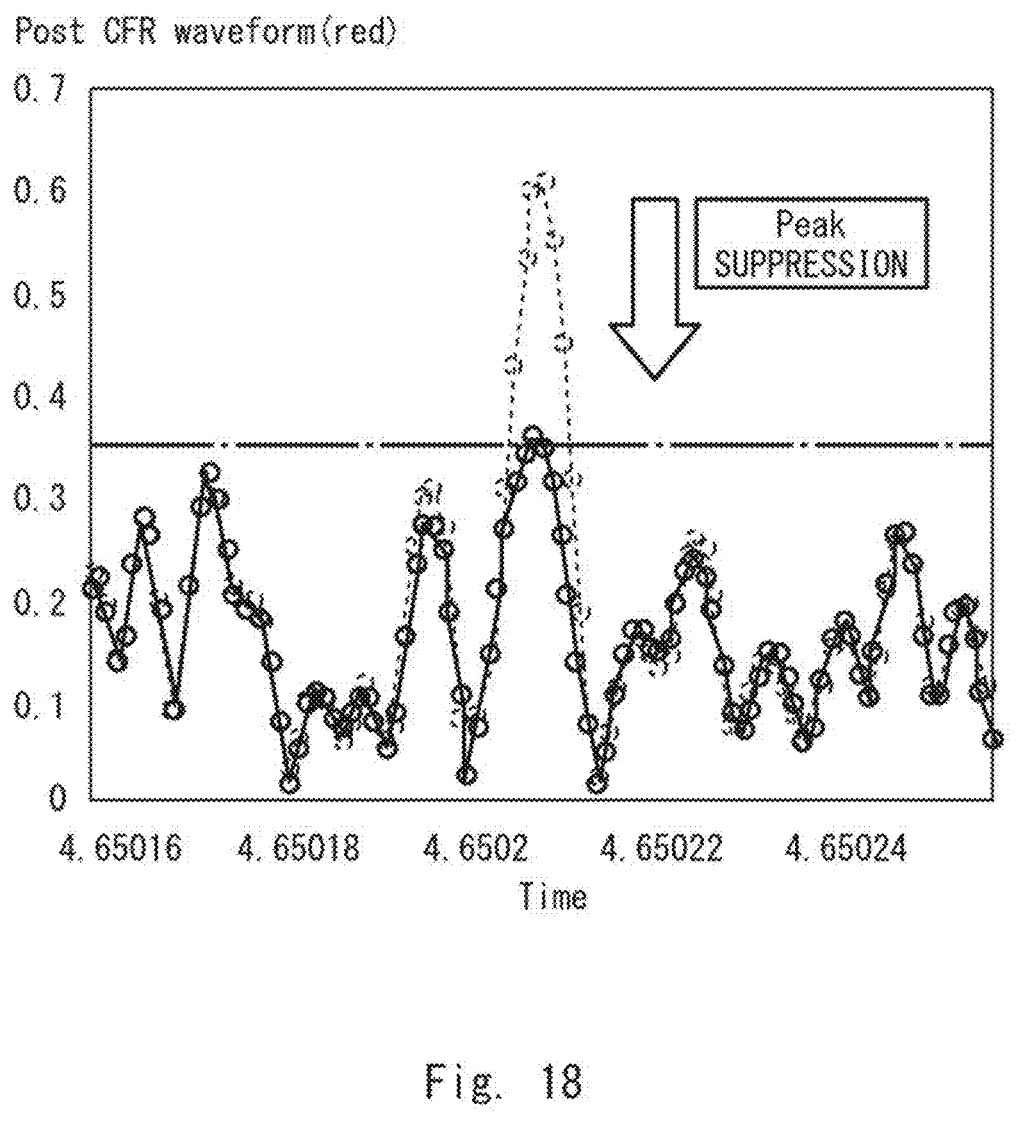

FIG. 18 is a diagram illustrating an example in which a peak of a synthesized time signal of a plurality of CCs is suppressed by the inverse impulse illustrated in FIG. 17;

EXAMPLE EMBODIMENT

Hereinafter, example embodiments of the present disclosure are described with reference to the drawings.

First Example Embodiment

Figure 23:
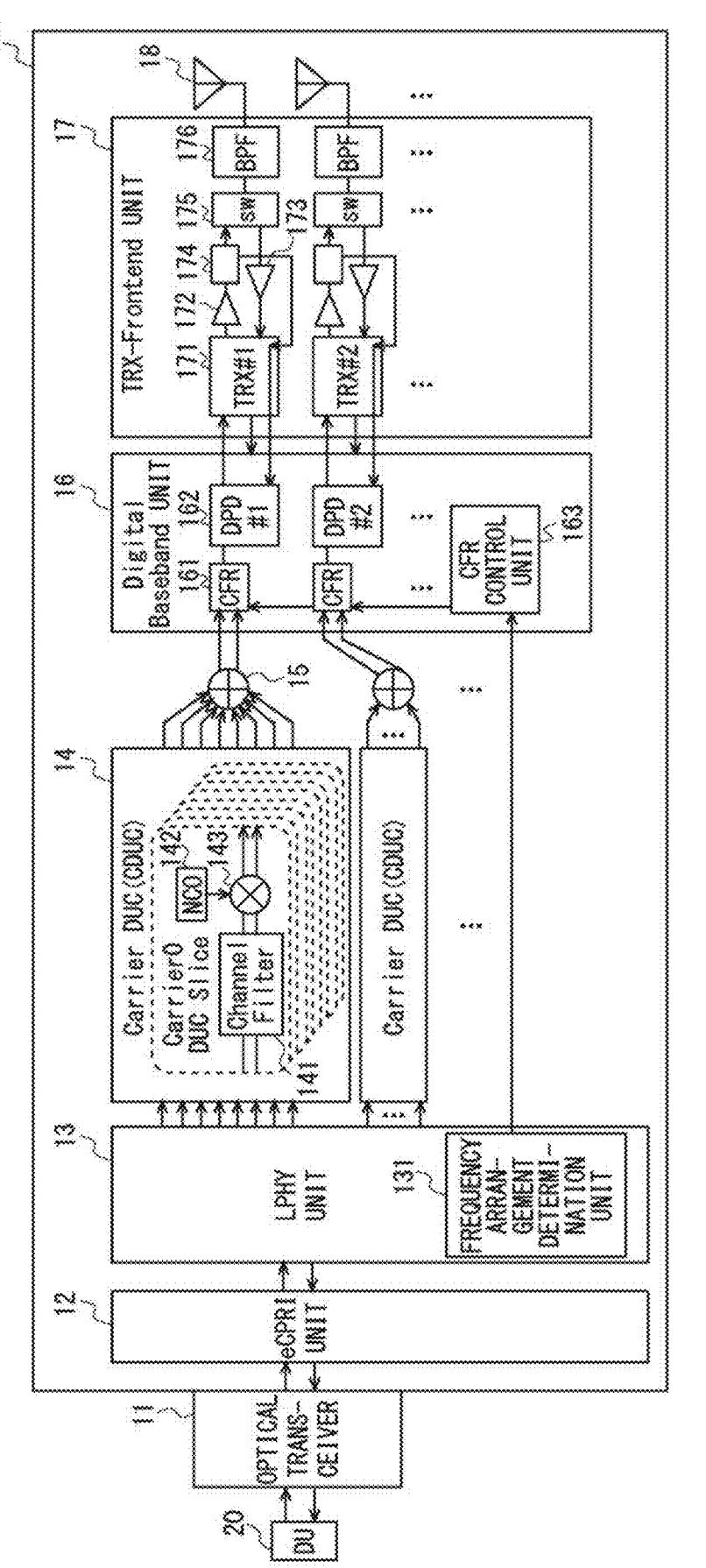
FIG. 23 is a diagram illustrating a configuration example of an RU according to a first example embodiment.

FIG. 23 is a diagram illustrating a configuration example of an RU 10A according to the first example embodiment.

Figure 1:
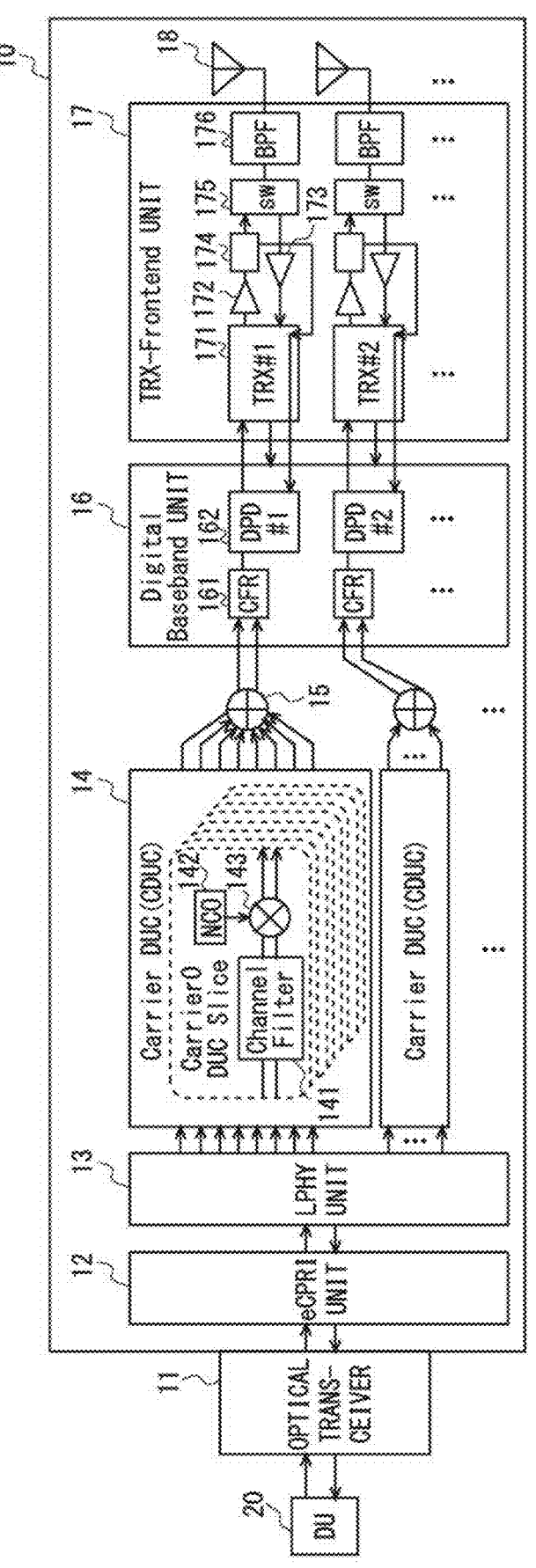
FIG. 1 is a diagram illustrating a configuration example of an RU according to the related art.
Figure 3:
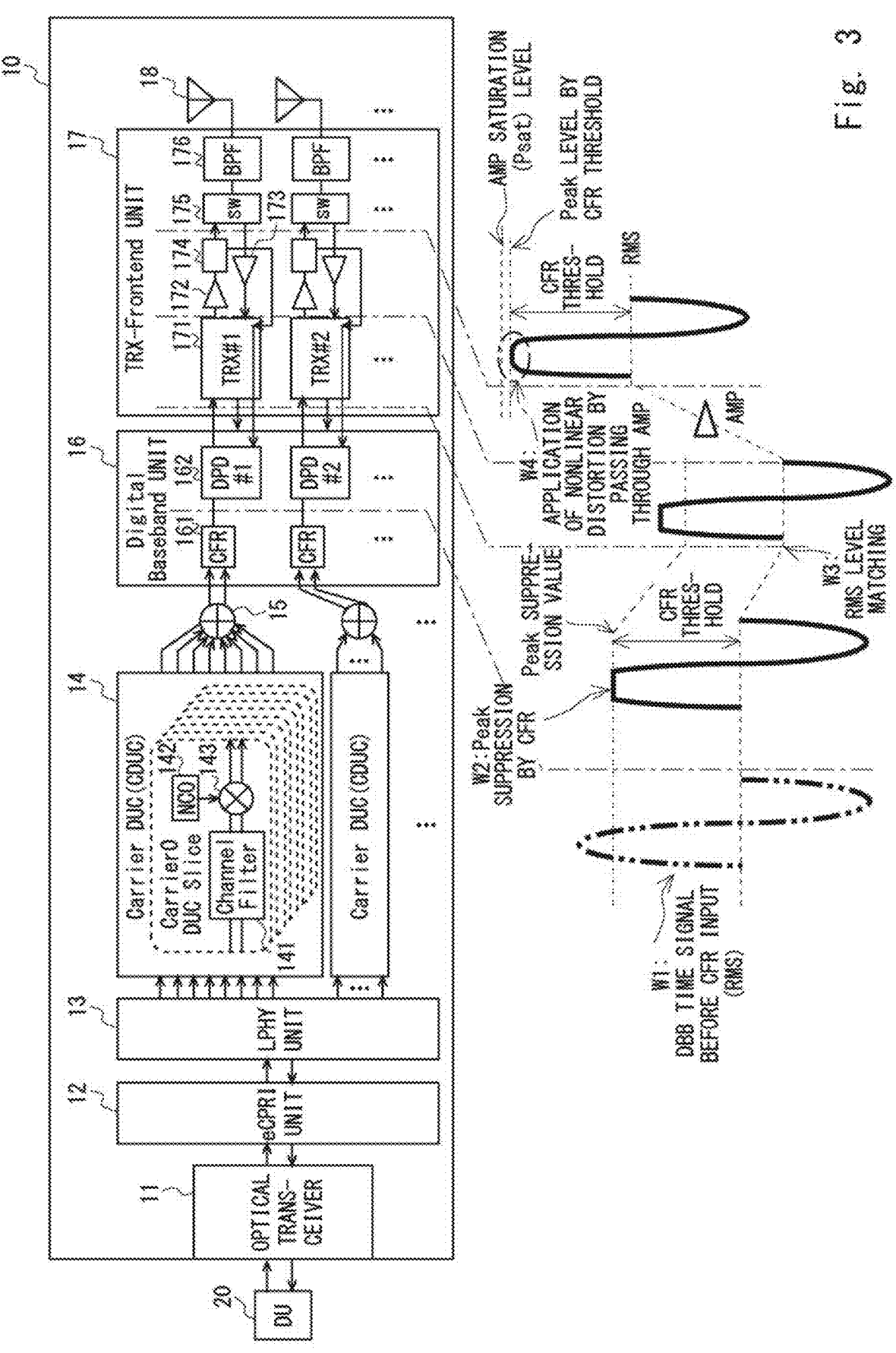
FIG. 3 is a diagram illustrating an example of a waveform of a synthesized time signal of a plurality of CCs after an input stage of a CFR circuit in the RU illustrated in FIG. 1.
Figure 4:
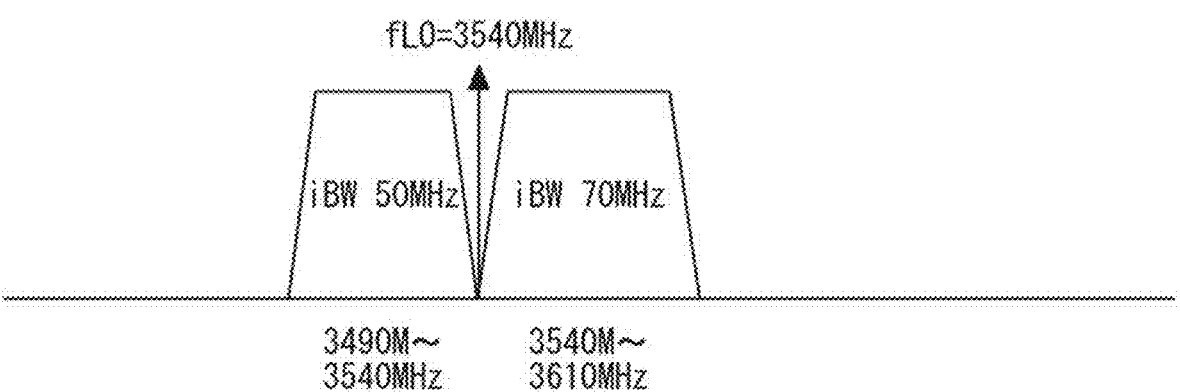
FIG. 4 is a diagram illustrating an example of frequency arrangement of a synthesized time signal of a plurality of CCs in a 2CC contiguous state.
Figure 5:
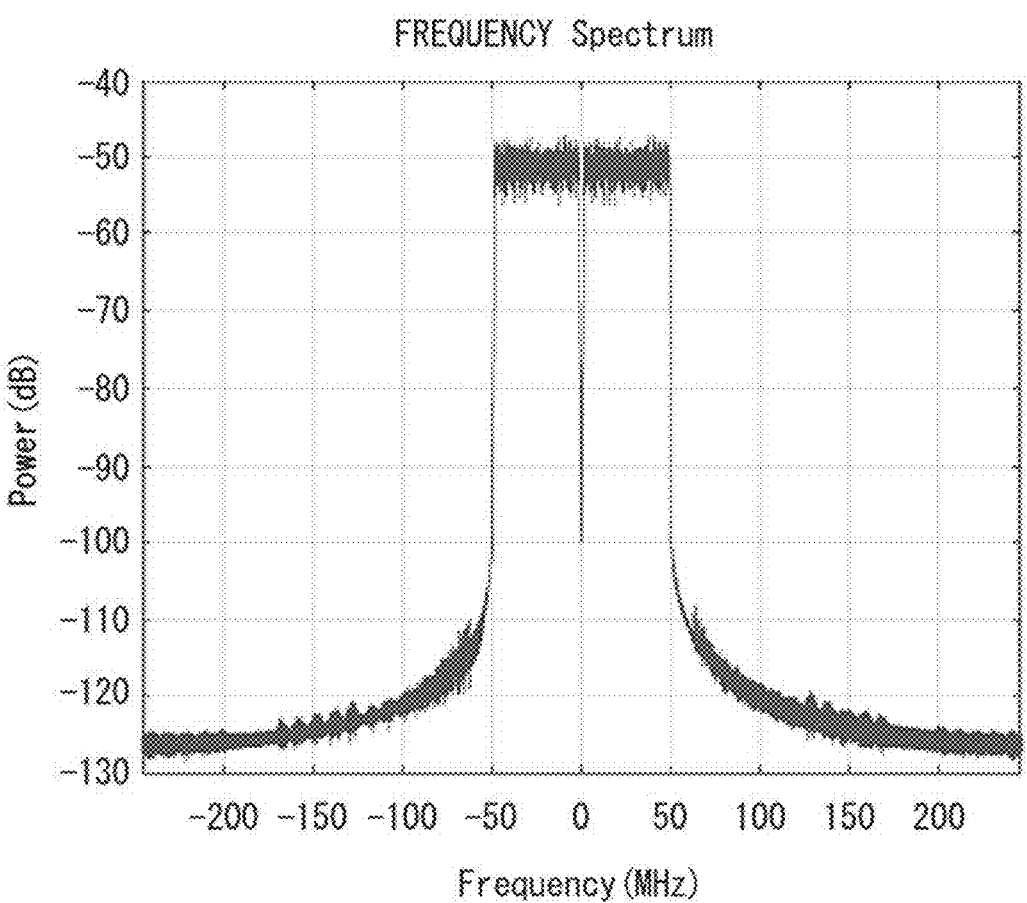
FIG. 5 is a diagram illustrating an example of the frequency spectrum of the synthesized time signal of the plurality of CCs in a 2CC contiguous state illustrated in FIG. 4.
Figure 6:
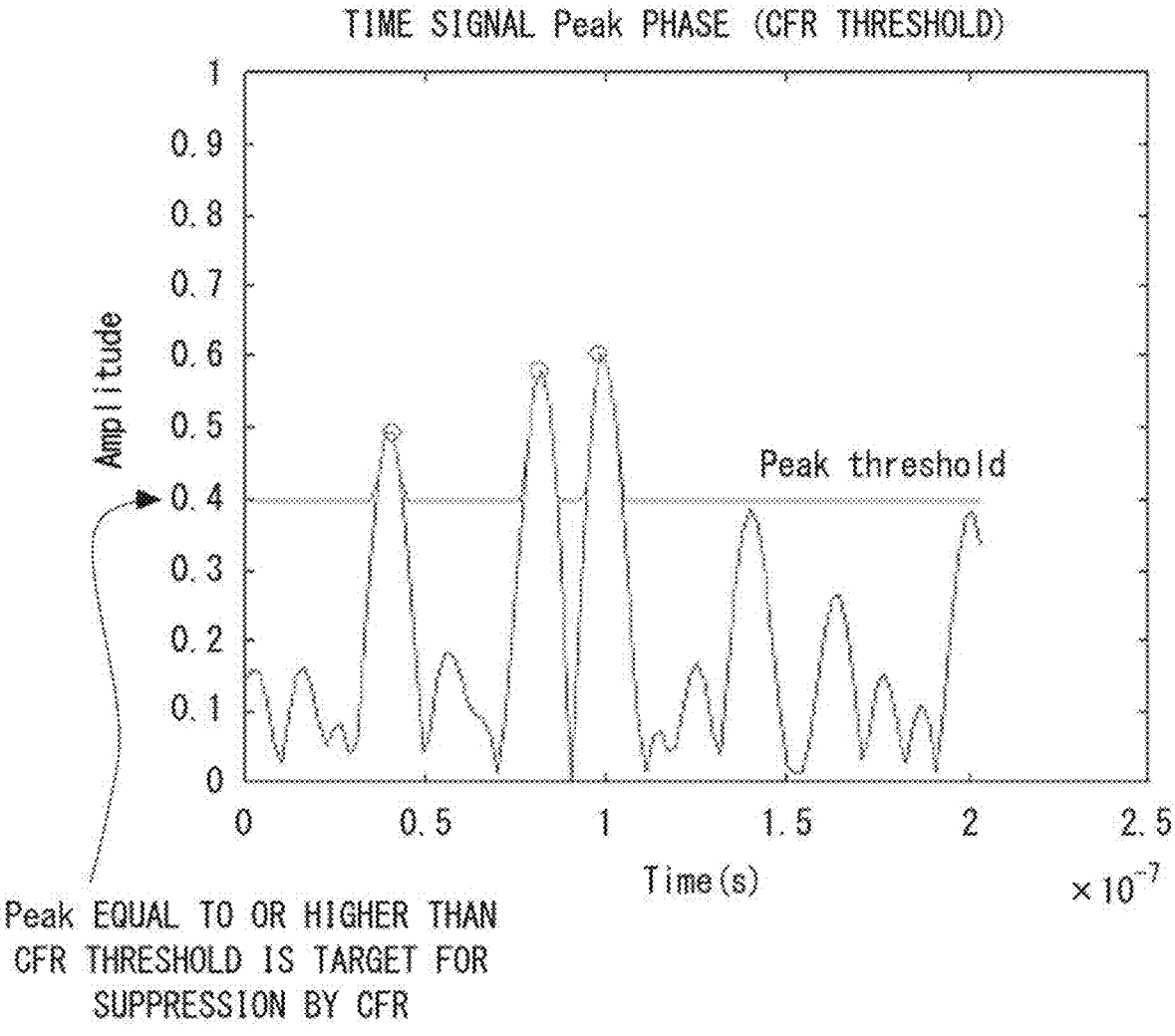
FIG. 6 is a diagram illustrating an example of a peak phase of the synthesized time signal of the plurality of CCs in a 2CC contiguous state illustrated in FIG. 4.
Figure 7:
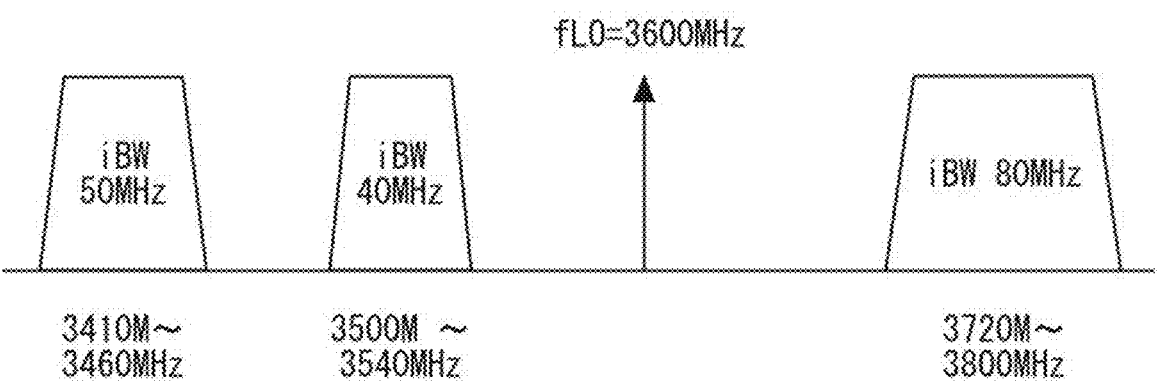
FIG. 7 is a diagram illustrating an example of frequency arrangement of a synthesized time signal of a plurality of CCs in a 3CC non-contiguous state.
Figure 8:
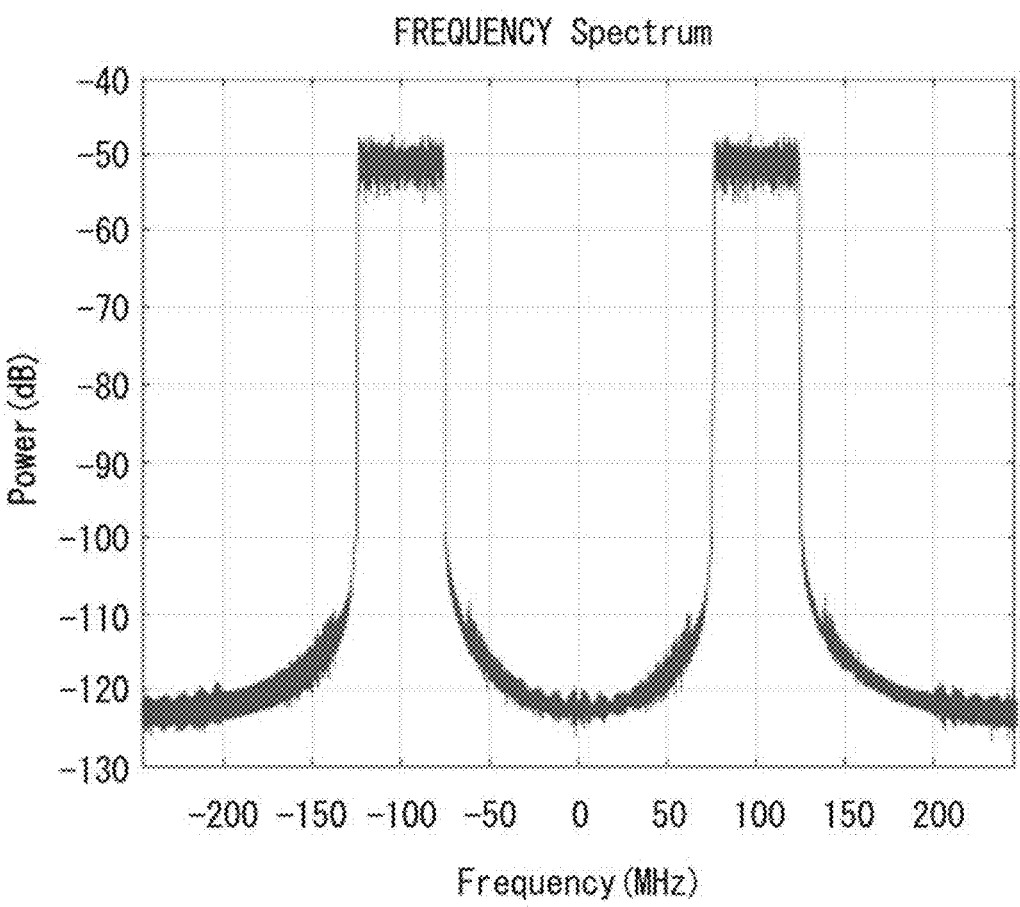
FIG. 8 is a diagram illustrating an example of a frequency spectrum of a synthesized time signal of a plurality of CCs in a 2CC non-contiguous state, which is a state similar to the 3CC non-contiguous state illustrated in FIG. 7.
Figure 9:
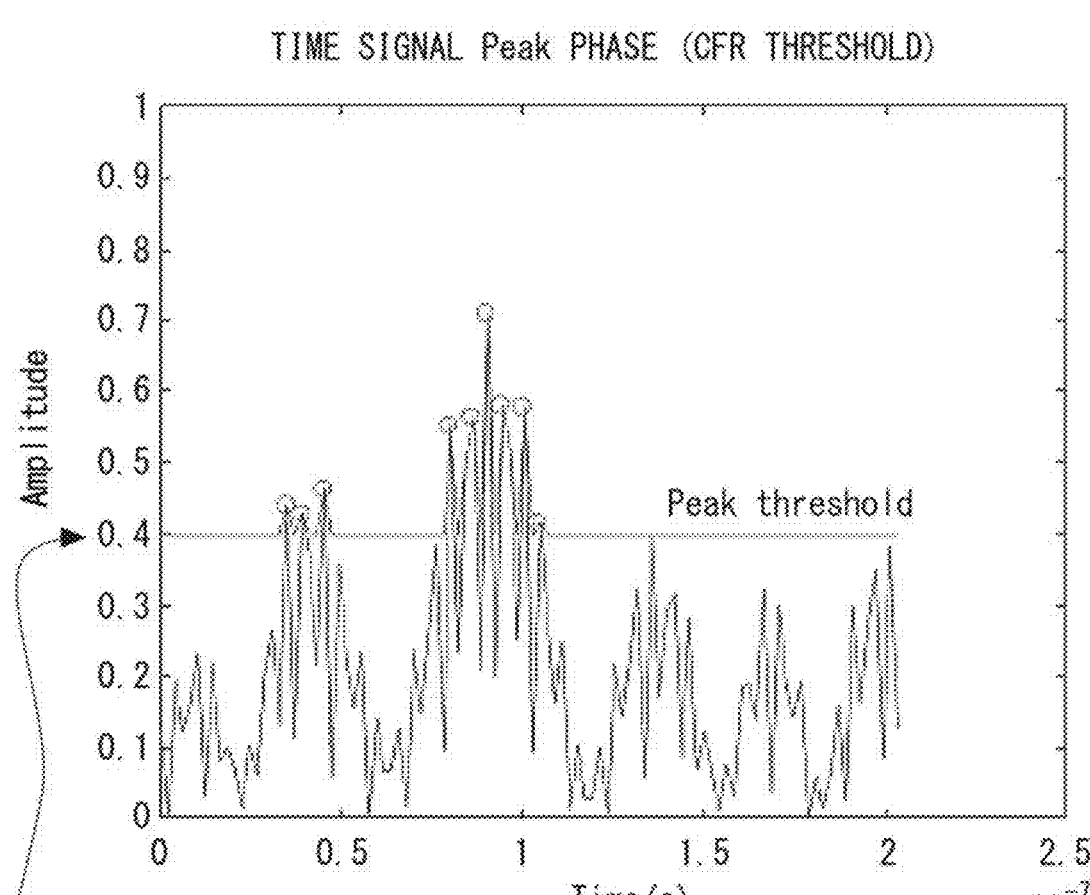
FIG. 9 is a diagram illustrating an example of a peak phase of the synthesized time signal of the plurality of CCs in a 2CC non-contiguous state, which is a state similar to the 3CC non-contiguous state illustrated in FIG. 7.
Figure 10:
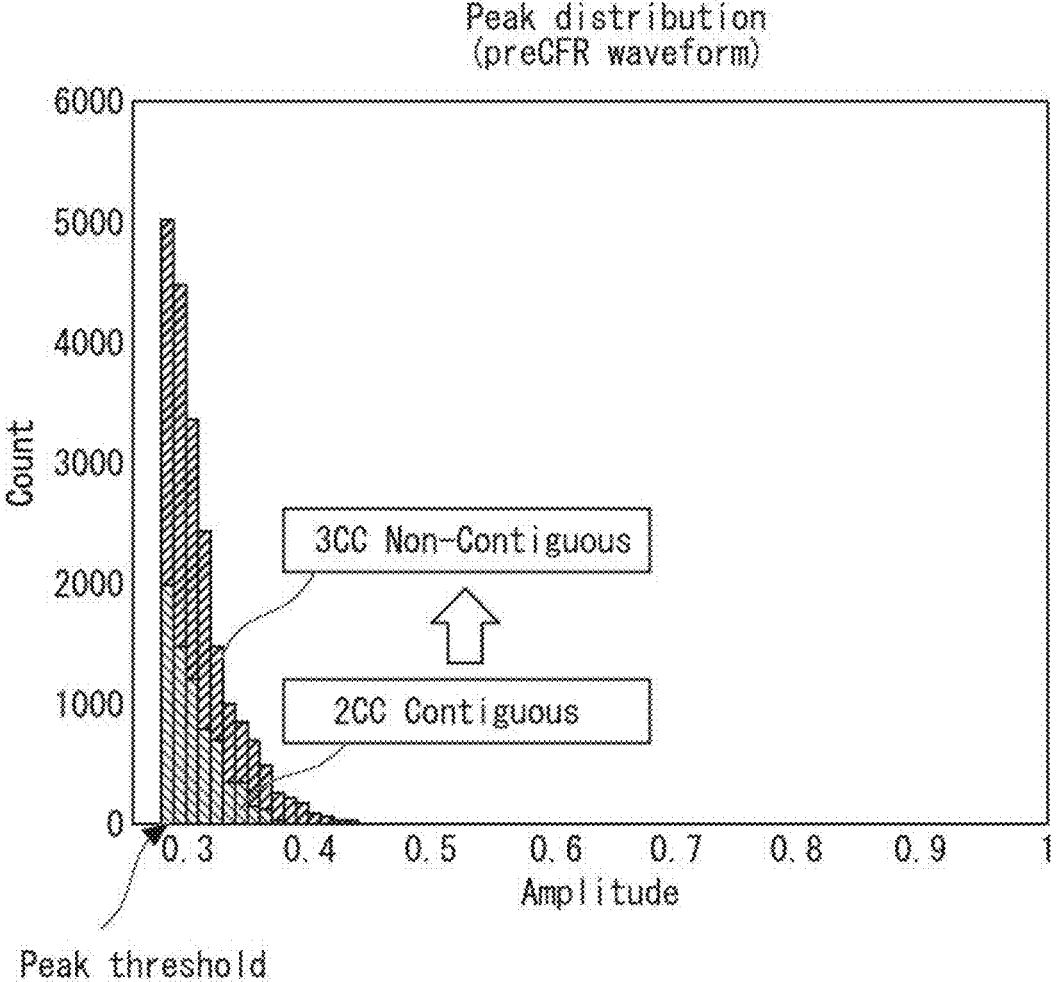
FIG. 10 is a diagram illustrating an example of a peak distribution of a synthesized time signal of a plurality of CCs in each of a 2CC contiguous state and a 3CC non-contiguous state.
Figure 11:
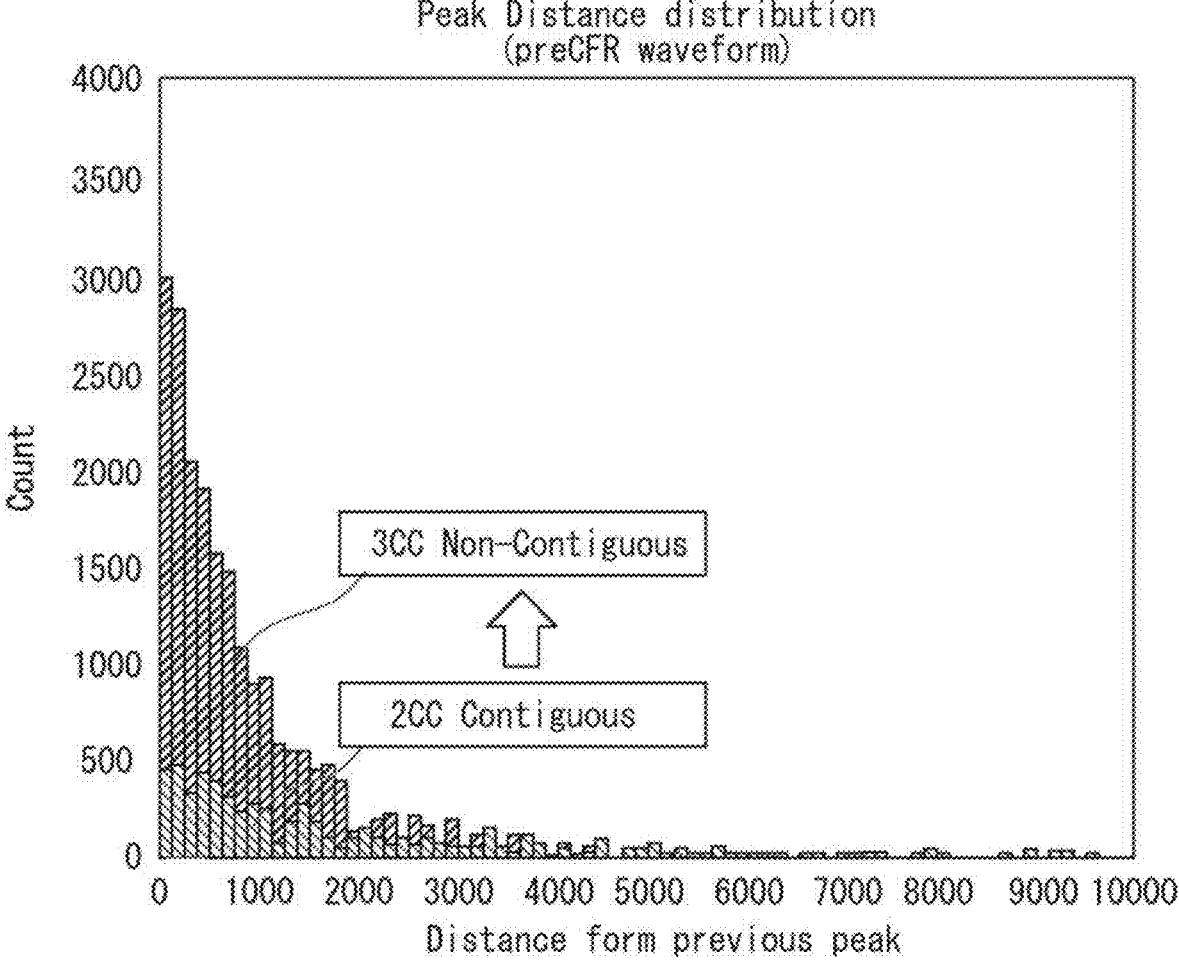
FIG. 11 is a diagram illustrating an example of a peak distance distribution of a synthesized time signal of a plurality of CCs in each of a 2CC contiguous state and a 3CC non-contiguous state.
Figure 12:
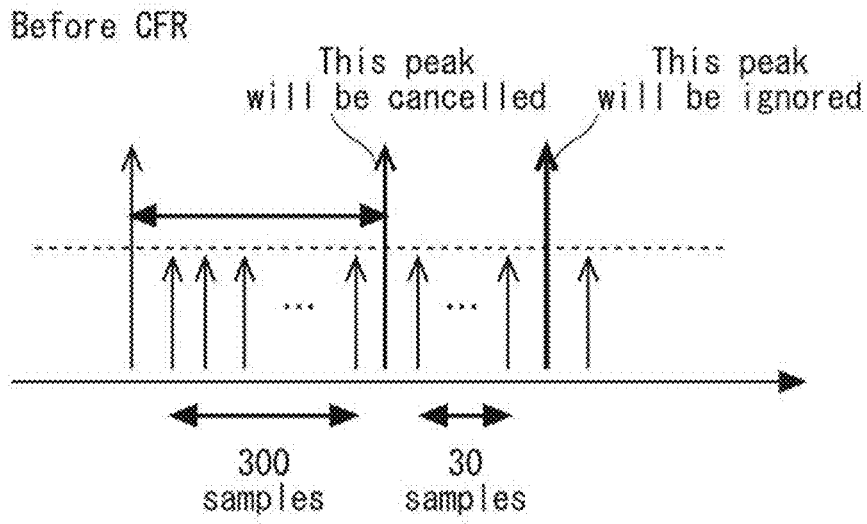
FIG. 12 is a diagram illustrating an example of a peak phase before and after CFR processing by a CFR circuit is performed once on a synthesized time signal of a plurality of CCs having certain frequency arrangement.
Figure 12:
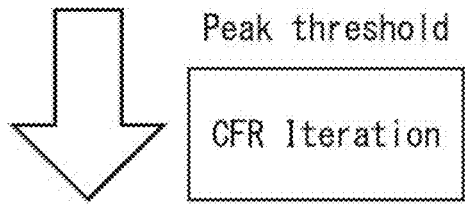
Figure 12:
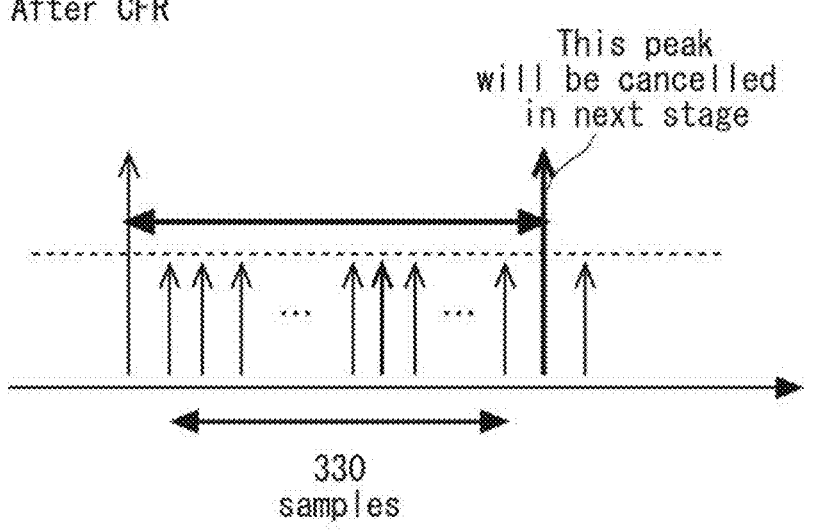
Figure 13:
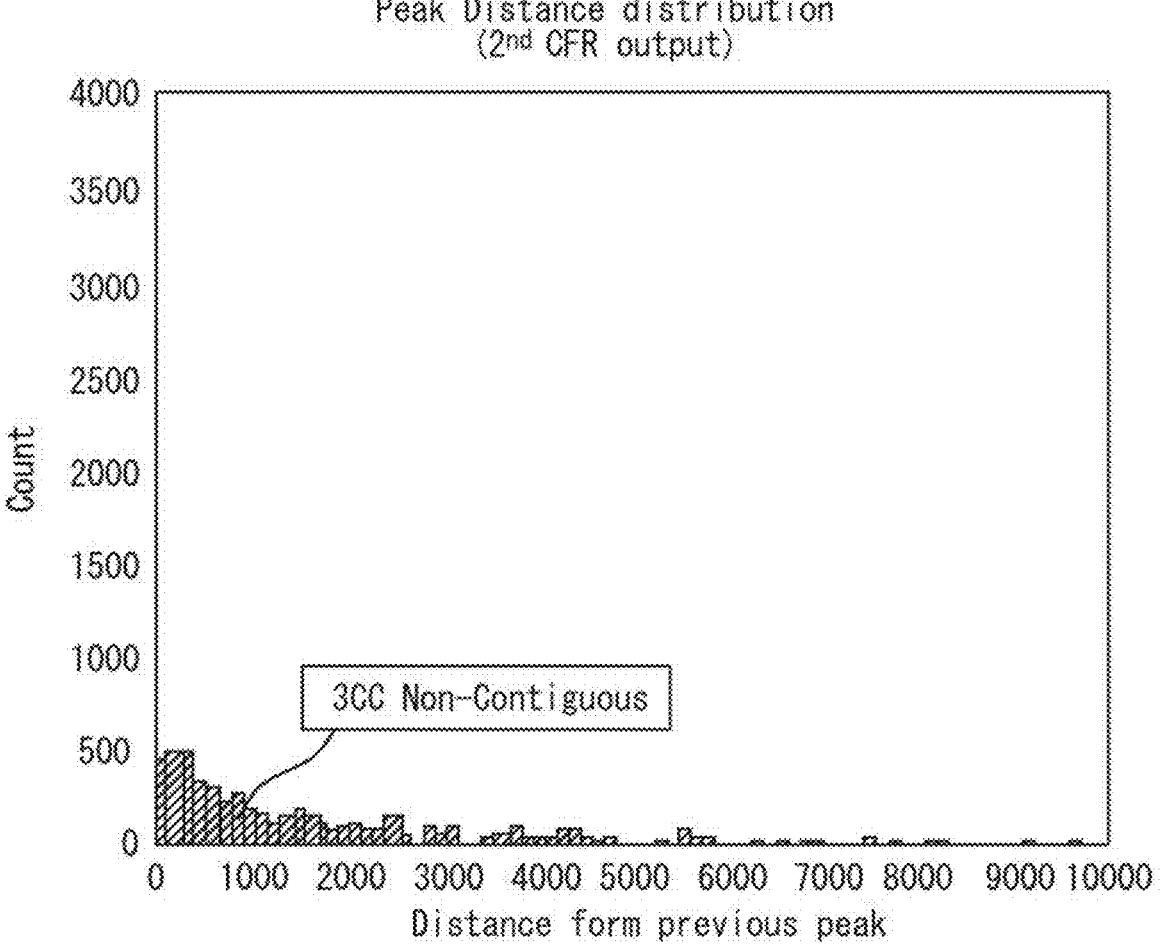
FIG. 13 is a diagram illustrating an example of a peak distance distribution after CFR processing is performed twice on a synthesized time signal of a plurality of CCs in each of a 2CC contiguous state and a 3CC non-contiguous state.
Figure 14:
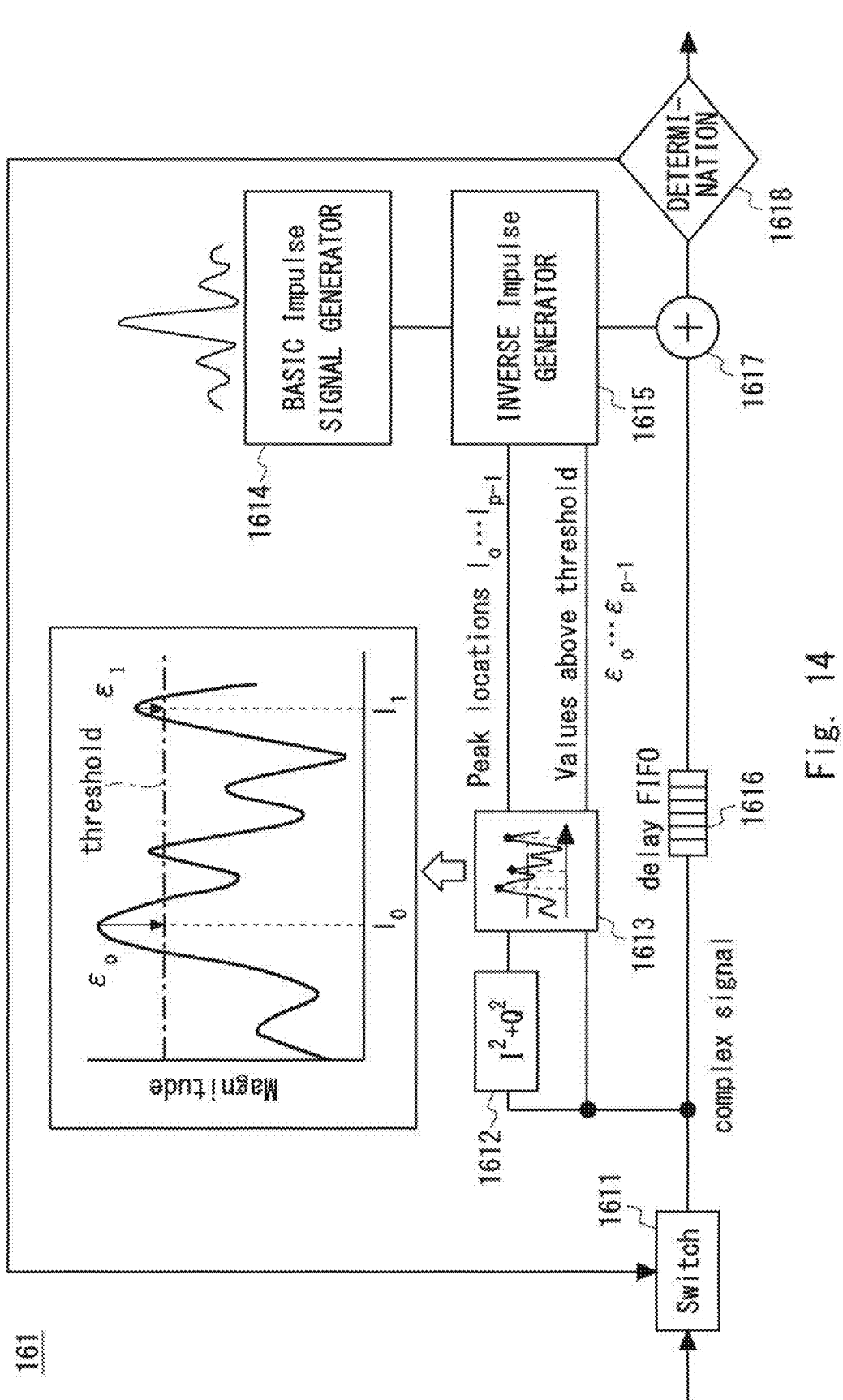
FIG. 14 is a diagram illustrating a configuration example of a CFR circuit.
Figure 15:
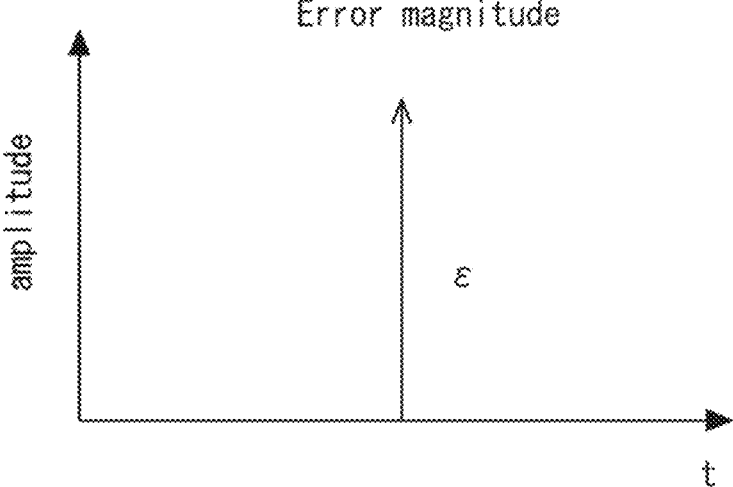
FIG. 15 is a diagram illustrating an example of an inverse impulse base signal being generated by the CFR circuit according to the related art.
Figure 16:
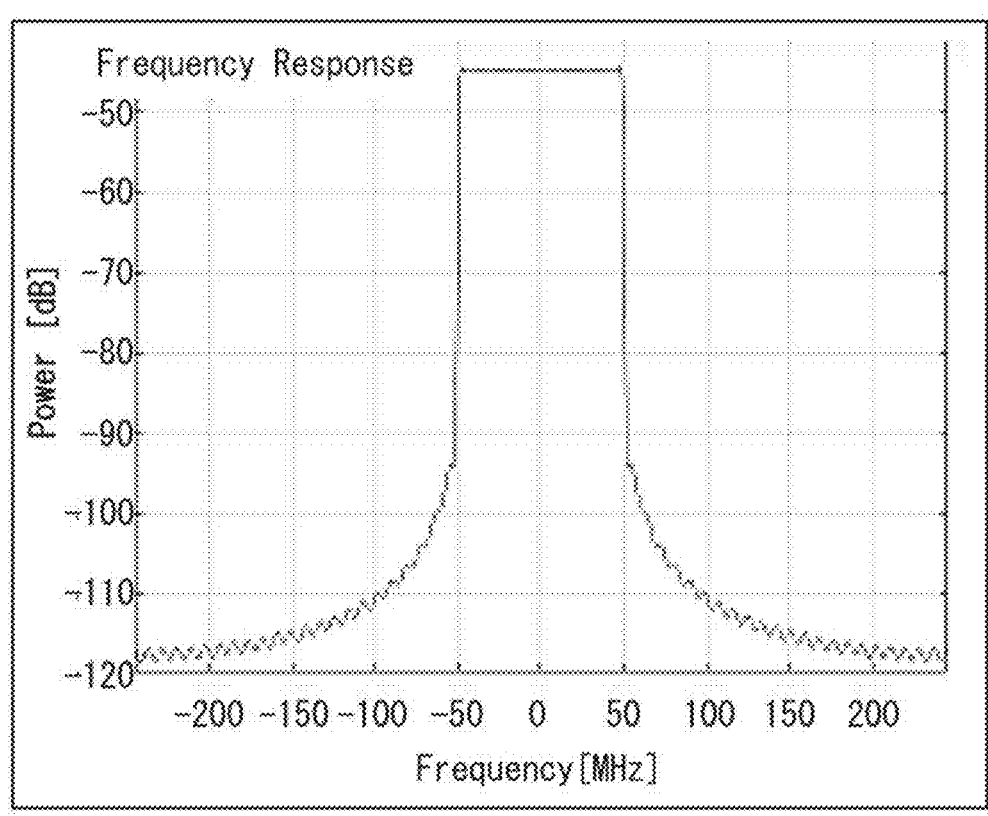
FIG. 16 is a diagram illustrating an example of processing of generating, in the CFR circuit according to the related art, an inverse impulse by passing an inverse impulse base signal through a CFR filter having a passband according to frequency arrangement of a synthesized time signal of a plurality of CCs.
Figure 16:
Figure 16:
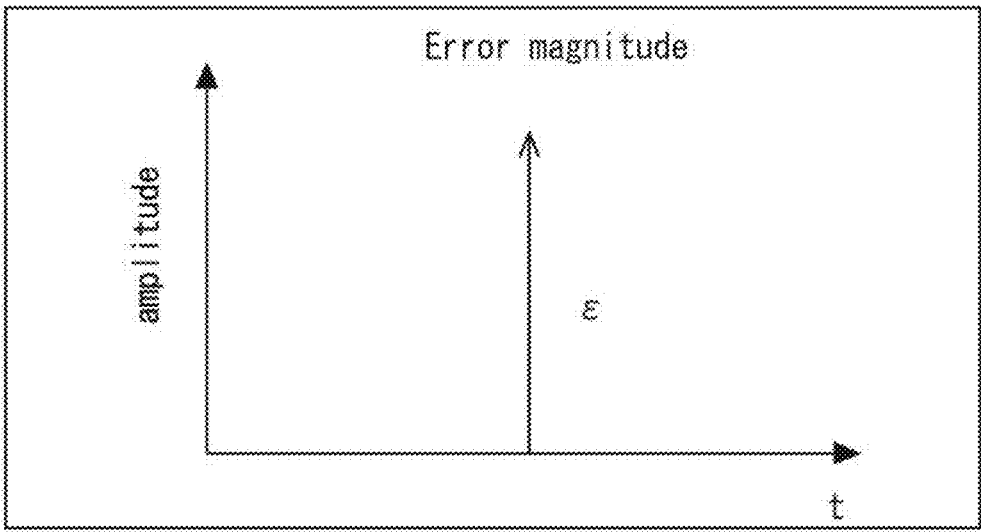
Figure 17:
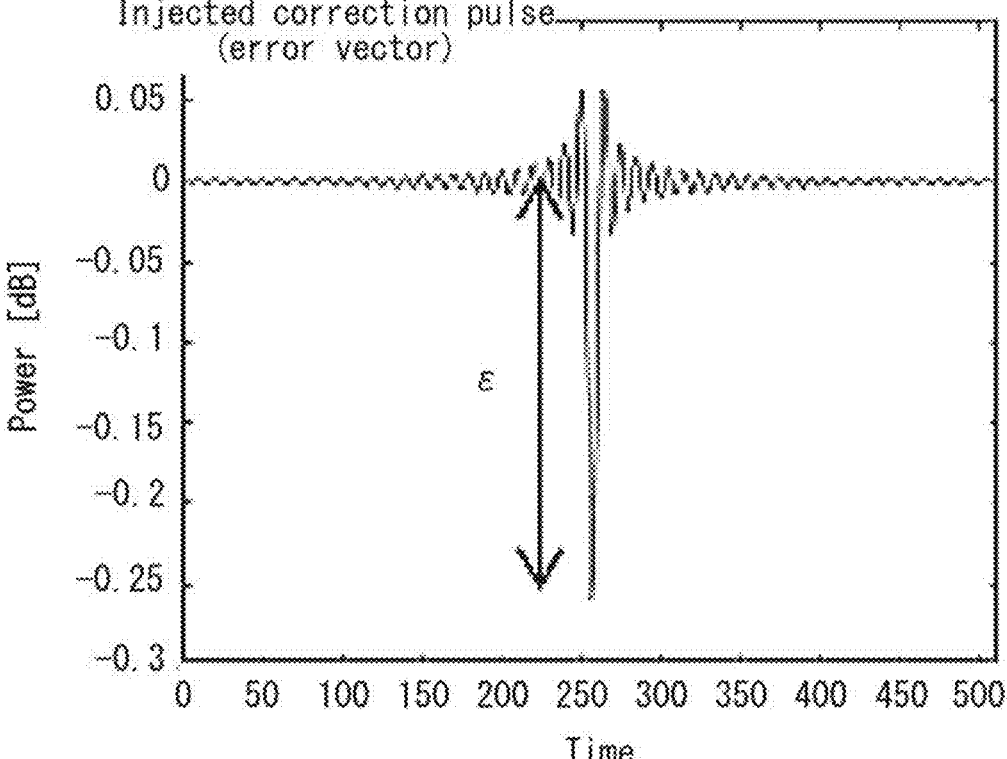
FIG. 17 is a diagram illustrating an example of the inverse impulse generated by the processing illustrated in FIG. 16.
Figure 19:
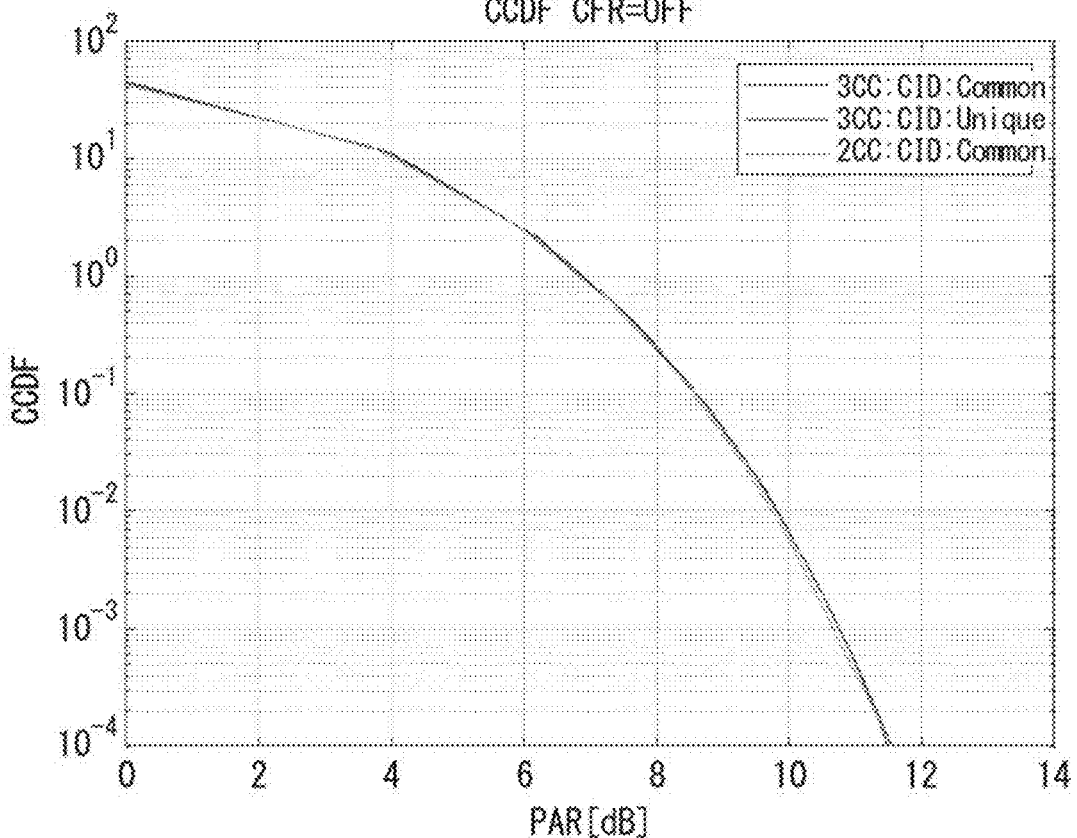
FIG. 19 is a diagram illustrating an example of a PAPR/CCDF property when CFR is inactivated of a synthesized time signal of a plurality of CCs in each of a 2CC contiguous state and a 3CC non-contiguous state.
Figure 20:
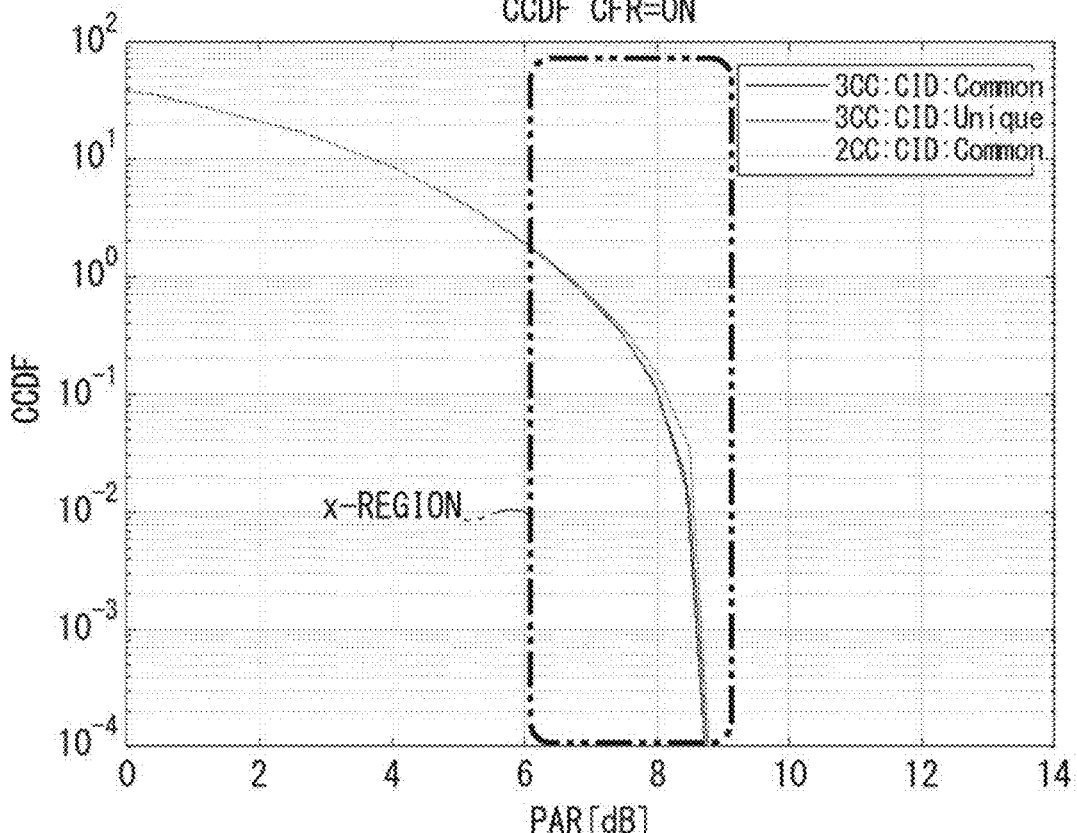
FIG. 20 is a diagram illustrating an example of a PAPR/CCDF property when CFR is activated of a synthesized time signal of a plurality of CCs in each of a 2CC contiguous state and a 3CC non-contiguous state.
Figure 21:
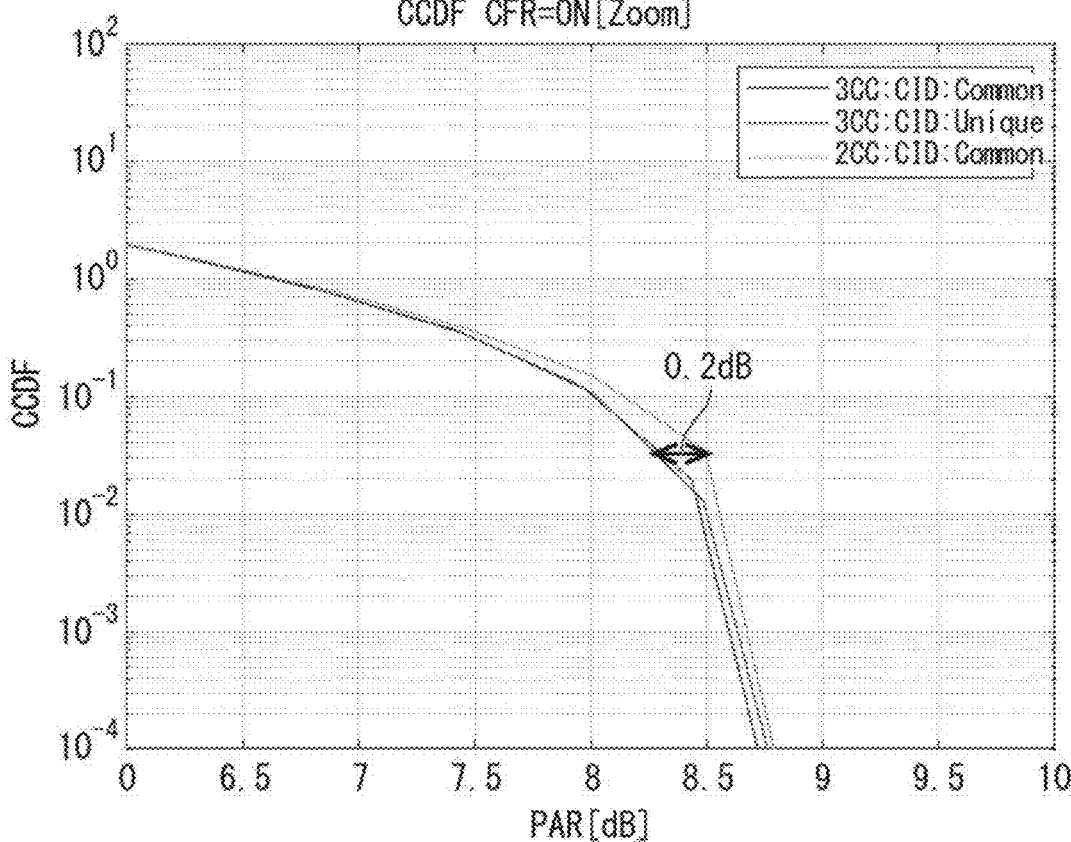
FIG. 21 is an enlarged view of an x-region illustrated in FIG. 20.
Figure 22:
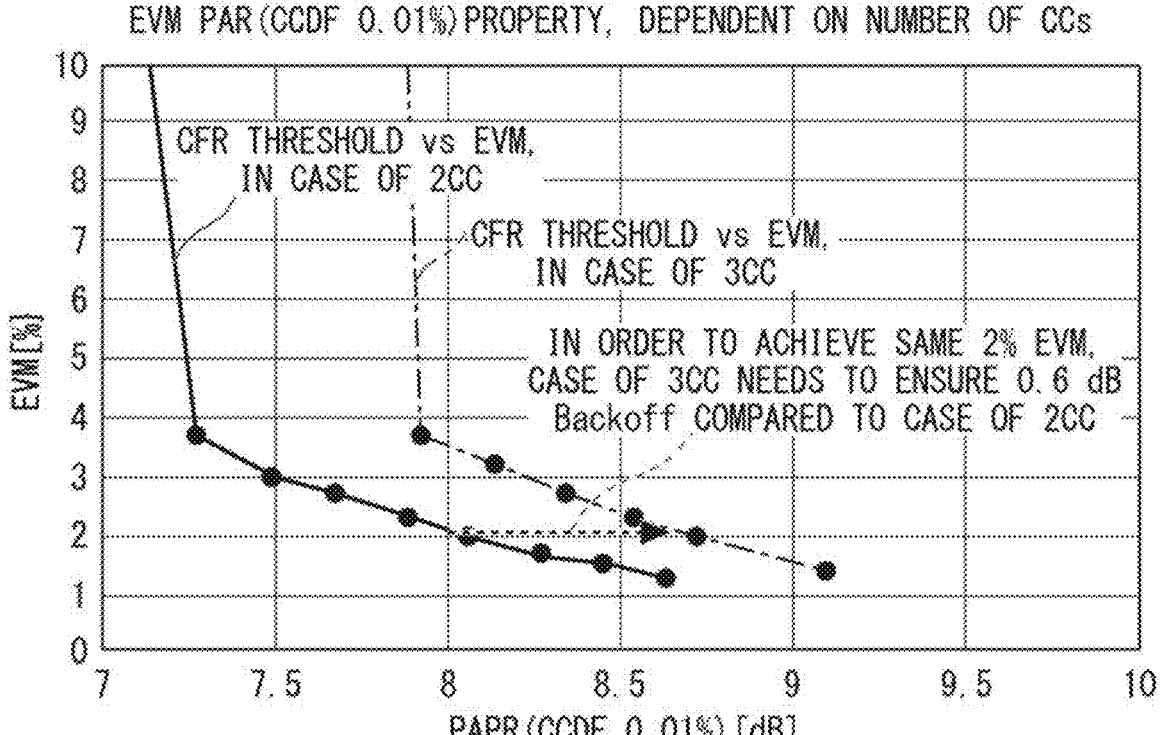
FIG. 22 is a diagram illustrating an example of a PAPR/EVM property of a synthesized time signal of a plurality of CCs in each of a 2CC contiguous state and a 3CC non-contiguous state.

As illustrated in FIG. 23, the RU 10A according to the first example embodiment differs from the RU 10 according to the related art illustrated in FIG. 1 in that frequency arrangement determination unit 131 and a CFR control unit 163 are added.

The frequency arrangement determination unit 131 is provided in an LPHY unit 13, and determines the frequency arrangement of a synthesized time signal of a plurality of CCs being input to a CFR circuit 161.

As described above, the LPHY unit 13 includes an IFFT unit (not illustrated) that converts a plurality of CC signals input for each frequency into a time signal for each CC. In the preceding stage of the IFFT unit, a plurality of CC signals for each frequency are in a state before being synthesized.

Therefore, the frequency arrangement determination unit 131 determines the presence or absence of a plurality of CCs on the basis of the frequency spectrum of the plurality of CC signals in the preceding stage of the IFFT unit.

Further, each of a plurality of CDUCs 14 includes a plurality of (eight in FIG. 23) DUC slices, and each DUC slice uses an NCO 142 and a multiplier 143 to arrange the CC time signals on a DBB frequency axis. At this time, the frequency arrangement determination unit 131 outputs NCO control information for controlling the NCO 142 to each CDUC 14. Each CDUC 14 controls the NCO 142, based on the NCO control information, and arranges the CC time signal on the DBB frequency axis.

Thus, the frequency arrangement determination unit 131 holds the NCO control information.

Therefore, the frequency arrangement determination unit 131 determines the frequency arrangement of the synthesized time signal of the plurality of CCs, based on the presence or absence of the plurality of CCs determined in the preceding stage of the IFFT unit and the NCO control information. Specifically, the frequency arrangement determination unit 131 determines the number of CCs, the frequency interval between CCs, and the like as the frequency arrangement of the synthesized time signal of the plurality of CCs. Therefore, the frequency arrangement determination unit 131 may determine whether the frequency arrangement of the synthesized time signal of the plurality of CCs is in a 2CC contiguous state, a 2CC non-contiguous state, or a 3CC non-contiguous state.

The CFR control unit 163 is provided in a digital baseband unit 16, and controls the CFR circuit 161, based on the frequency arrangement of the synthesized time signal of the plurality of CCs determined by the frequency arrangement determination unit 131.

As described above, an inverse impulse generator 1615 in the CFR circuit 161 uses a CFR Filter (correction pulse filter) to generate the inverse impulse. At this time, the passband of the CFR filter needs to conform to the frequency arrangement of the synthesized time signal of the plurality of CCs being input to the CFR circuit 161.

Therefore, in the first example embodiment, in order to generate such an inverse impulse frequency spectrum that only allows a plurality of CCs having different passbands and different frequency arrangement from one another to pass through, the inverse impulse generator 1615 selects, from among a plurality of CFR filters, a CFR filter having a passband according to the frequency arrangement determined by the frequency arrangement determination unit 131. The inverse impulse generator 1615 generates an inverse impulse by passing an inverse impulse base signal through the CFR filter selected by the CFR control unit 163.

Therefore, even when the frequency arrangement of the synthesized time signal of the plurality of CCs is changed, the CFR circuit 161 is able to be autonomously set to an optimum setting according to the change in the frequency arrangement.

This contributes to solving the above-described first technical problem. Next, a method that may contribute to solving the above-described second technical problem is described.

As described above, when the frequency arrangement of the synthesized time signal of the plurality of CCs is switched/changed from the 2CC contiguous state to the 2CC non-contiguous state or the 3CC non-contiguous state, the frequency of occurrence of the peak time is increased and the half width of the peak time is decreased in the synthesized time signal of the plurality of CCs.

Therefore, when a plurality of CCs are arranged in a non-contiguous manner, the degree of suppression of peak components increases when the number of times of the CFR iteration is increased. However, on the other hand, since the synthesized time signal of the plurality of CCs are excessively lost, the communication quality such as the EVM or the like is deteriorated.

Further, as described above, an iteration determiner 1618 in the CFR circuit 161 determines whether to perform CFR processing again according to whether the number of times of performing the CFR processing has reached the number of times of the CFR iteration being set in the CFR circuit 161.

Therefore, when the frequency arrangement determination unit 131 determines that the frequency interval between the CCs is large, such as when the frequency arrangement of the synthesized time signal of the plurality of CCs is in the 2CC non-contiguous state or the 3CC non-contiguous state, the CFR control unit 163 reduces the number of times of the CFR iteration to be set in the CFR circuit 161. That is, the CFR control unit 163 performs control such that the number of times of the CFR iteration decreases as the frequency interval between the CCs increases. When the frequency arrangement of the synthesized time signal of the plurality of CCs includes three or more CCs, the frequency interval between the CCs being used for determining the number of times of the CFR iteration may be either the largest or the smallest.

Therefore, excessive loss of the synthesized time signal of the plurality of CCs is avoided, and thus it is possible to maintain the communication quality such as the EVM or the like.

This contributes to solving the above-described second technical problem.

Next, another method that may contribute to solving the above-described second technical problem is described.

As described above, when the frequency arrangement of the synthesized time signal of the plurality of CCs is switched/changed from the 2CC contiguous state to the 2CC non-contiguous state or the 3CC non-contiguous state, the frequency of the occurrence of the peak time is increased and the half width of the peak time is decreased in the synthesized time signal of the plurality of CCs.

Therefore, when a plurality of CCs are arranged in a non-contiguous manner, the degree of suppression of the peak components increases if the CFR thresholds are lowered. However, on the other hand, since the synthesized time signal of the plurality of CCs are excessively lost, the communication quality such as the EVM is deteriorated.

Further, as described above, the inverse impulse generator 1615 in the CFR circuit 161 calculates the correction amplitude (error magnitude vector) c, being the peak suppression amount, and generates the inverse impulse, based on the calculated correction amplitude E.

Therefore, when the frequency arrangement determination unit 131 determines that the frequency interval between the CCs is large, such as when the frequency arrangement of the synthesized time signal of the plurality of CCs is in a 2CC non-contiguous state or a 3CC non-contiguous state, the CFR control unit 163 controls the CFR circuit 161 in such a way that the correction amplitude c as the inverse impulse becomes small. At this time, the CFR control unit 163 sets the correction amplitude c to be smaller as the frequency interval between the CCs is larger.

Specifically, the inverse impulse generator 1615 in the CFR circuit 161 multiplies the correction amplitude c by a weight, and generates an inverse impulse, based on the acquired correction amplitude ε'.

When the frequency arrangement determination unit 131 determines that the frequency interval between the CCs is large, the CFR control unit 163 performs control in such a way that the weight being set in the inverse impulse generator 1615 becomes small. At this time, the CFR control unit 163 makes the inverse impulse correction smaller as the frequency interval between the CCs is larger. When the frequency arrangement of the synthesized time signal of the plurality of CCs includes three or more CCs, the frequency interval between the CCs being used for determining the weight may be either the largest or the smallest.

Figure 24:
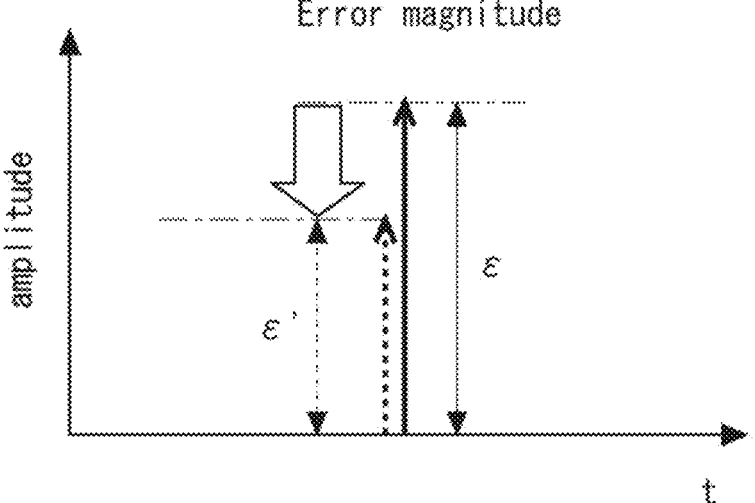
FIG. 24 is a diagram illustrating an example of an inverse impulse base signal generated by a CFR circuit according to the first example embodiment.
Figure 25:
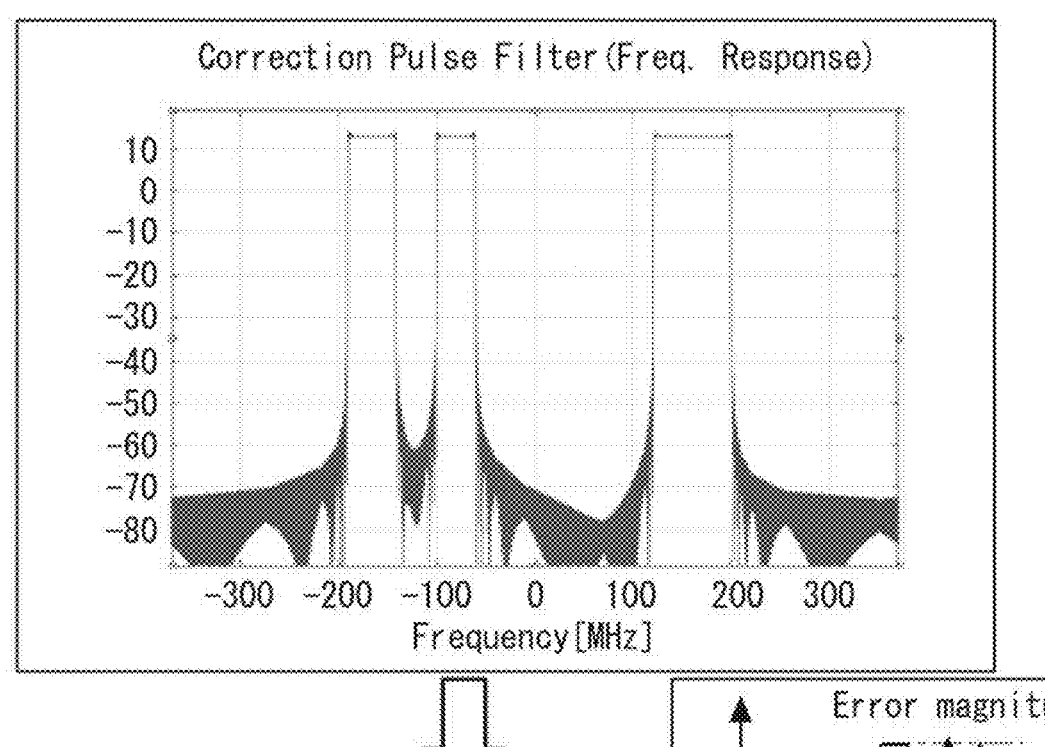
FIG. 25 is a diagram illustrating an example of processing of generating, in the CFR circuit according to the first example embodiment, an inverse impulse by passing the inverse impulse base signal through a CFR filter having a passband according to frequency arrangement of a synthesized time signal of a plurality of CCs.
Figure 25:
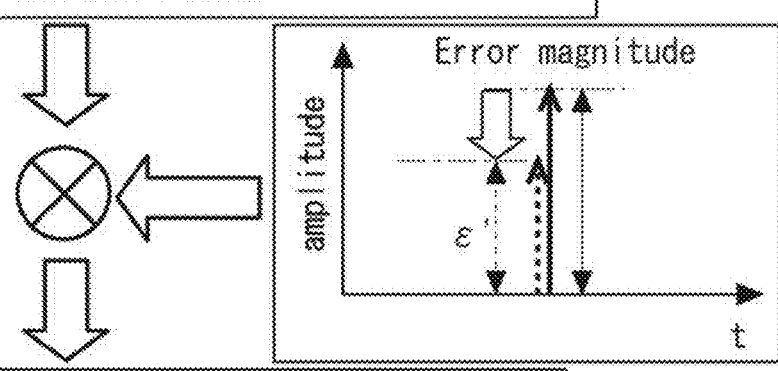
Figure 25:
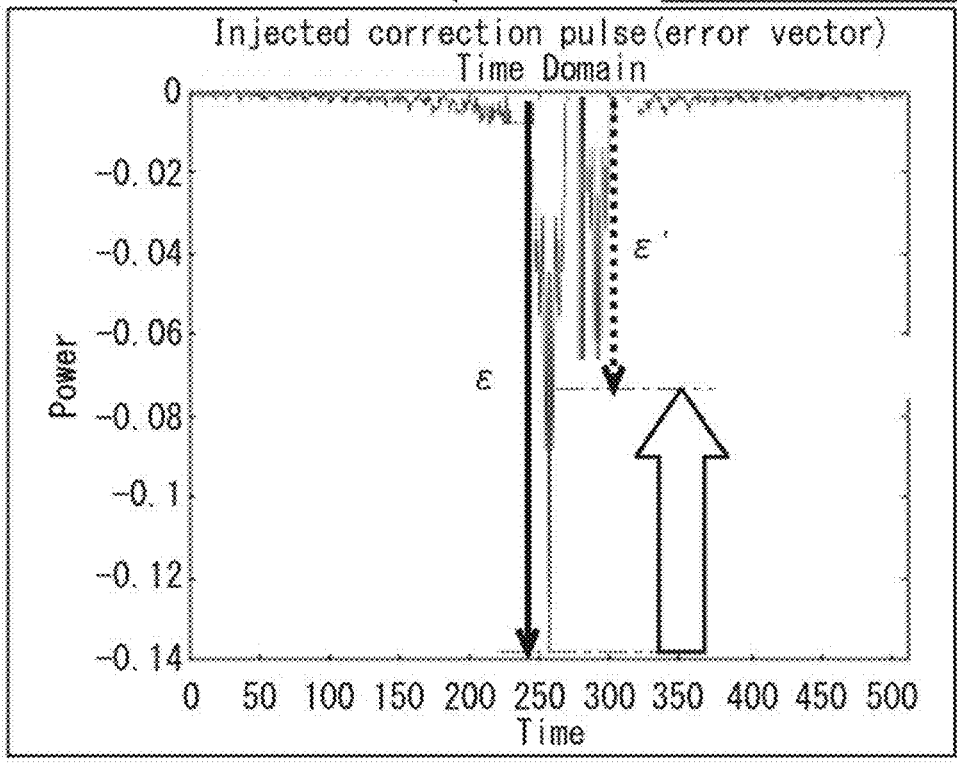
Figure 26:
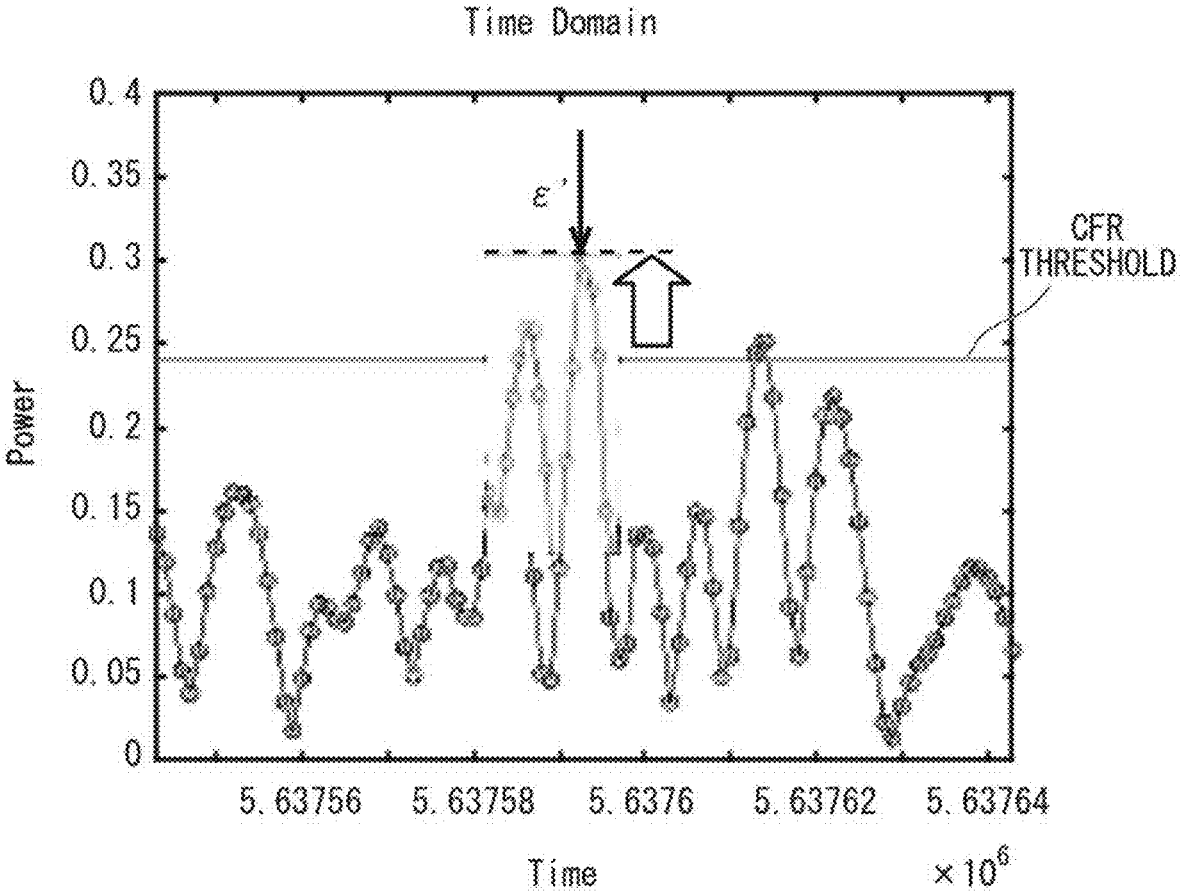
FIG. 26 is a diagram illustrating an example in which a peak of the synthesized time signal of the plurality of CCs is suppressed by the inverse impulse illustrated in FIG. 25.

FIG. 24 is a diagram illustrating an example of an inverse impulse base signal being generated by the CFR circuit 161 according to the first example embodiment. FIG. 25 is a diagram illustrating an example of processing of generating, in the CFR circuit 161 according to the first example embodiment, an inverse impulse by passing an inverse impulse base signal through a CFR filter having a passband according to the frequency arrangement of the synthesized time signal of a plurality of CCs. FIG. 26 is a diagram illustrating an example in which a peak of the synthesized time signal of the plurality of CCs is suppressed in the CFR circuit 161 according to the first example embodiment.

As illustrated in FIGS. 24, 25, and 26, in the first example embodiment, it can be seen that the peak suppression amount is reduced from an amount corresponding to c to an amount corresponding to C.

Therefore, excessive loss of the synthesized time signal of the plurality of CCs is avoided, and thus it is possible to maintain the communication quality such as the EVM.

This contributes to solving the above-described second technical problem.

As described above, according to the first example embodiment, the frequency arrangement determination unit 131 determines the frequency arrangement of the synthesized time signal of the plurality of CCs being input to the CFR circuit 161. The CFR control unit 163 controls the CFR circuit 161, based on the frequency arrangement of the synthesized time signal of the plurality of CCs determined by the frequency arrangement determination unit 131. Specifically, the CFR control unit 163 selects a CFR filter having a passband according to the frequency arrangement determined by the frequency arrangement determination unit 131. The inverse impulse generator 1615 in the CFR circuit 161 generates an inverse impulse by using the CFR filter selected by the CFR controller 163.

Therefore, even when the frequency arrangement of the synthesized time signal of the plurality of CCs is changed, the CFR circuit 161 can be autonomously set to an optimum setting according to the change of the frequency arrangement.

This contributes to solving the above-described first technical problem.

Therefore, even if trade or the like of a frequency band is frequently performed in the U.S. and Europe after the RU 10A is arranged, the CFR circuit 161 is autonomously set to an optimum setting by the RU 10A alone. Therefore, it is possible to acquire an effect that a setting change by the RU 10A is required neither locally nor remotely.

Further, according to the first example embodiment, when the frequency arrangement determination unit 131 determines that the frequency interval between the CCs is large, the CFR control unit 163 reduces the number of times of the CFR iteration in the CFR circuit 161 or reduces the correction amplitude being the peak suppression amount in the CFR circuit 161. Therefore, excessive loss of the synthesized time signal of the plurality of CCs is avoided, and thus it is possible to maintain the communication quality such as the EVM.

This contributes to solving the above-described second technical problem.

This eliminates the need to satisfy the EVM standard by increasing power backoff and reducing the level of the maximum rated transmission power (RMS), that is, EIRP, implicitly. Therefore, it is possible to secure the EVM required for each DL QAM (that is, DL SINR) without sacrificing the transmission EIRP. In addition, DL-SINR/EVM can be secured without lowering the EIRPs from the low-order to high-order QAMs (QPSK/16QAM/64QAM/256QAM/1024QAM). Therefore, even when a plurality of CCs are arranged in a non-contiguous manner over a wide band, reduction in DL coverage can be avoided and DL coverage can be maintained.

Second Example Embodiment

The second example embodiment corresponds to an example embodiment in which the first example embodiment described above is put into a higher-level concept.

Figures 27, 28:
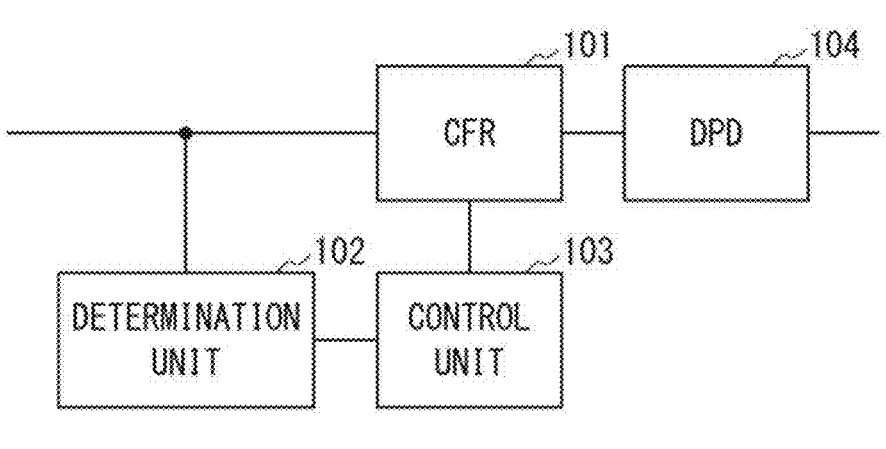
FIG. 27 is a diagram illustrating a configuration example of a wireless communication apparatus according to a second example embodiment.
FIG. 28 is a flowchart illustrating an example of a schematic operation flow of the wireless communication apparatus according to the second example embodiment.

FIG. 27 is a diagram illustrating a configuration example of a wireless communication apparatus 10B according to the second example embodiment.

As illustrated in FIG. 27, the wireless communication apparatus 10B according to the second example embodiment includes a CFR circuit 101, a determination unit 102, a control unit 103, and a DPD circuit 104.

The wireless communication apparatus 10B corresponds to the RU 10A according to the first example embodiment described above.

The CFR circuit 101 corresponds to the CFR circuit 161 according to the first example embodiment described above.

The DPD circuit 104 corresponds to the DPD circuit 162 according to the first example embodiment described above.

The determination unit 102 determines frequency arrangement of a synthesized time signal of a plurality of CCs being input to the CFR circuit 101. The synthesized time signal of the plurality of CCs is a signal acquired by synthesizing time signals for each of a plurality of CCs. The determination unit 102 corresponds to the frequency arrangement determination unit 131 according to the first example embodiment described above.

The control unit 103 controls the CFR circuit 101, based on the frequency arrangement of the synthesized time signal of the plurality of CCs determined by the determination unit 102. The control unit 103 corresponds to the CFR control unit 163 according to the first example embodiment described above.

FIG. 28 is a flowchart illustrating an example of a schematic operation flow of the wireless communication apparatus 10B according to the second example embodiment.

As illustrated in FIG. 28, the determination unit 102 determines the frequency arrangement of the synthesized time signal of the plurality of CCs being input to the CFR circuit 101 (step S11). The control unit 103 controls the CFR circuit 101, based on the frequency arrangement of the synthesized time signal of the plurality of CCs determined by the determination unit 102 (step S12).

As described above, according to the second example embodiment, the determination unit 102 determines the frequency arrangement of the synthesized time signal of the plurality of CCs being input to the CFR circuit 101, and the control unit 103 controls the CFR circuit 101, based on the frequency arrangement of the synthesized time signal of the plurality of CCs determined by the determination unit 102.

Therefore, even when the frequency arrangement of the synthesized time signal of the plurality of CCs is changed, the CFR circuit 101 can be autonomously set to an optimum setting according to the change of the frequency arrangement.

This contributes to solving the above-described first technical problem.

Specifically, the CFR circuit 101 may hold a plurality of filters having different passbands from one another. Further, the control unit 103 may select, from among the plurality of filters, a filter having a passband according to the frequency arrangement of the synthesized time signal of the plurality of CCs determined by the determination unit 102. Further, the CFR circuit 101 may perform CFR processing for suppressing the peak of the synthesized time signal of the plurality of CCs by using the filter selected by the control unit 103.

Further, the CFR circuit 101 may repeatedly perform the CFR processing. Further, the control unit 103 may control the number of repetitions of the CFR processing in the CFR circuit 101, based on the frequency interval between the CCs in the frequency arrangement of the synthesized time signal of the plurality of CCs determined by the determination unit 102. At this time, the control unit 103 may decrease the number of repetitions of the CFR processing in the CFR circuit 101 as the frequency interval between the CCs in the frequency arrangement of the synthesized time signal of the plurality of CCs determined by the determination unit 102 increases.

Further, the control unit 103 may control the correction amplitude being the suppression amount of the peak of the CFR processing in the CFR circuit 101, based on the frequency interval between the CCs in the frequency arrangement of the synthesized time signal of the plurality of CCs determined by the determination unit 102. At this time, the control unit 103 may decrease the correction amplitude in the CFR circuit 101 as the frequency interval between the CCs in the frequency arrangement of the synthesized time signal of the plurality of CCs determined by the determination unit 102 increases.

As described above, the control unit 103 controls the number of repetitions of the CFR processing and the correction amplitude in the CFR circuit 101, based on the frequency interval between the CCs in the frequency arrangement of the synthesized time signal of the plurality of CCs. Therefore, excessive loss of the synthesized time signal of the plurality of CCs is avoided, and thus it is possible to maintain the communication quality such as the EVM.

This contributes to solving the above-described second technical problem.

Although the present disclosure has been described with reference to the example embodiments, the present disclosure is not limited to the above-described example embodiments. Various changes that can be understood by a person skilled in the art within the scope of the present disclosure can be made to the configuration and details of the present disclosure.

For example, some functions of the wireless communication apparatus (including an RU) according to the present disclosure may be implemented by causing a processor such as a central processing unit (CPU) to execute a program.

Figure 29:
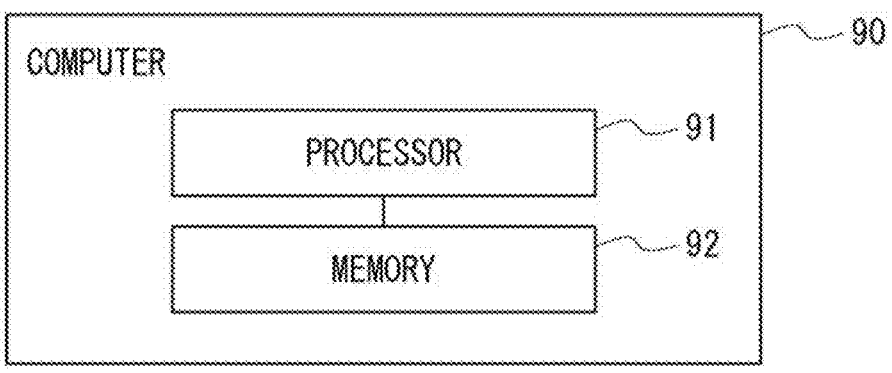
FIG. 29 is a diagram illustrating an example of a hardware configuration of a computer that implements some functions of the wireless communication apparatus according to the present disclosure.

FIG. 29 is a diagram illustrating an example of a hardware configuration of a computer 90 that implements some functions of the wireless communication apparatus according to the present disclosure.

As illustrated in FIG. 29, the computer 90 includes a processor 91 and a memory 92.

The processor 91 may be, for example, a microprocessor, a CPU, or a micro processing unit (MPU). The processor 91 may include a plurality of processors.

The memory 92 includes a combination of a volatile memory and a non-volatile memory. The memory 92 may include storage located away from the processor 91. In such a case, the processor 91 may access the memory 92 via an input/output (I/O) interface (not illustrated).

A program is stored in the memory 92. The program includes instructions (or software codes) for causing the computer 90 to perform some functions of the RU 10A or the wireless communication apparatus 10B according to the first or second example embodiment described above when the program is read into the computer 90. The components in the RU 10A or the wireless communication apparatus 10B described above may be implemented by the processor 91 reading and executing a program stored in the memory 92. In addition, the component having the storage function in the RU 10A or the wireless communication apparatus 10B described above may be implemented by the memory 92. The above-described program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

The first and second example embodiments can be combined as desirable by one of ordinary skill in the art.

What is claimed is:

1. A wireless communication apparatus comprising:
a crest factor reduction (CFR) circuit;
a digital pre-distortion (DPD) circuit;
at least one memory configured to store instructions; and
at least one processor configured to execute the instructions to determine frequency arrangement of a synthesized time signal of a plurality of component carriers (CCs) acquired by synthesizing time signals of each of the plurality of CCs being input to the CFR circuit, and control the CFR circuit, based on the determined frequency arrangement of the synthesized time signal of the plurality of CCs, wherein the frequency arrangement indicates whether the CCs are non-contiguously arranged or contiguously arranged, and also indicates a frequency interval between the CCs.

2. The wireless communication apparatus according to claim 1, wherein the CFR circuit holds a plurality of filters having different passbands from one another, the at least one processor executes the instructions to select, from among the plurality of filters, a filter having a passband according to the determined frequency arrangement of the synthesized time signal of the plurality of CCs, and the CFR circuit performs CFR processing of suppressing a peak of the synthesized time signal of the plurality of CCs by using the selected filter.

3. The wireless communication apparatus according to claim 2, wherein the CFR circuit repeatedly performs the CFR processing, and the at least one processor executes the instructions to control the number of repetitions of the CFR processing performed by the CFR circuit, based on a frequency interval between the CCs in the determined frequency arrangement of the synthesized time signal of the plurality of CCs.

4. The wireless communication apparatus according to claim 3, wherein the at least one processor executes the instructions to reduce the number of repetitions of the CFR processing performed by the CFR circuit as a frequency interval between the CCs in the determined frequency arrangement of the synthesized time signal of the plurality of CCs increases.

5. The wireless communication apparatus according to claim 2, wherein the at least one processor executes the instructions to control a correction amplitude being a suppression amount of a peak of the CFR processing performed by the CFR circuit, based on a frequency interval between the CCs in the determined frequency arrangement of the synthesized time signal of the plurality of CCs.

6. The wireless communication apparatus according to claim 5, wherein the at least one processor executes the instructions to reduce the correction amplitude in the CFR circuit as a frequency interval between the CCs in the determined frequency arrangement of the synthesized time signal of the plurality of CCs increases.

7. A wireless communication method to be executed by a wireless communication apparatus including a crest factor reduction (CFR) circuit and a digital pre-distortion (DPD) circuit, the method comprising:

determining frequency arrangement of a synthesized time signal of a plurality of component carriers (CCs) acquired by synthesizing time signals of each of the plurality of CCs being input to the CFR circuit; and controlling the CFR circuit, based on the determined frequency arrangement of the synthesized time signal of the plurality of CCs, wherein the frequency arrangement indicates whether the CCs are non-contiguously arranged or contiguously arranged, and also indicates a frequency interval between the CCs.

\* \* \* \* \*